United States Patent [19]
Dennis

[11] Patent Number: 5,469,533
[45] Date of Patent: Nov. 21, 1995

[54] RESOURCE-ORIENTED PRINTER SYSTEM AND METHOD OF OPERATION

[75] Inventor: Stephen V. Dennis, Bothell, Wash.

[73] Assignee: Microsoft Corporation, Redmond, Wash.

[21] Appl. No.: 911,767

[22] Filed: Jul. 19, 1992

[51] Int. Cl.⁶ .................................................. G06F 13/14
[52] U.S. Cl. ............................ 395/114; 395/110; 395/115
[58] Field of Search ..................................... 395/114, 115, 395/800, 110, 101

[56] References Cited

U.S. PATENT DOCUMENTS

| | | | |
|---|---|---|---|
| 4,881,180 | 11/1989 | Nishiyama | 364/518 |
| 5,142,667 | 8/1992 | Dimperio et al. | 395/115 |
| 5,156,454 | 9/1992 | Wood et al. | 395/114 |
| 5,220,667 | 6/1993 | Morgan et al. | 395/800 |

FOREIGN PATENT DOCUMENTS

| | | |
|---|---|---|
| 0452115 | 10/1991 | European Pat. Off. . |
| 0467598 | 1/1992 | European Pat. Off. . |
| 0470782 | 2/1992 | European Pat. Off. . |
| 0474153 | 3/1992 | European Pat. Off. . |
| 0478338 | 4/1992 | European Pat. Off. . |
| 0480593 | 4/1992 | European Pat. Off. . |

OTHER PUBLICATIONS

M. Hamdi, "Design Methodology of Multi Processor Systems for Real–Time Applications," *International Journal of Mini & Microcomputers*, 14/2:77–81, 1992.

Primary Examiner—Raymond L. Bayerl
Assistant Examiner—Tracy M. Legree
Attorney, Agent, or Firm—Seed and Berry

[57] ABSTRACT

A host computer and printer and method of operation in which the data file describing a document is examined by a resource assembler which determines which resources are required from the host computer to print the document. The resource assembler translates the document into a set of render primitives for each band or page of the document and creates a dependency list interrelating the required resources with each band or page. The resource assembler places the required resources and set of primitives into a host resource store and communicates the dependencies to other portions of the system. A resource loader uses the list to determine the most efficient manner for loading and releasing resources from a printer resource store. A resource scheduler controls the actual timing of resource and primitives transfer and determines when all required resources for a band or page are present within the printer resource store. The resource scheduler generates an execute signal which causes a resource executor to convert the primitives to a bit-map data file. The resource assembler may convert the primitives to a bit-map data file if the resource executor cannot convert the primitives in real-time while the print engine is printing the band or page. The resource assembler also converts the primitives if it is more efficient than the resource executor for converting a particular band or page. If bidirectional communication is available between the printer and host computer, the printer manages its own memory and determines the most efficient printing sequence. Enhanced error recovery is also possible with bidirectional communication.

184 Claims, 3 Drawing Sheets

RESOURCE-ORIENTED PRINTER SYSTEM AND METHOD OF OPERATION

TECHNICAL FIELD

The present invention relates to a system and method for printing with computer systems.

BACKGROUND OF THE INVENTION

Computer systems are highly useful for compiling and processing large mounts of data. Modem computer system often include graphics capabilities that allow the display and printing of graphic images. Printing a page of text and/or graphics images requires the conversion of data from the format used on a host computer to a format used by the particular printer selected. Typically, the computer data is translated into a bit-map data file where each bit represents a dot on the printed page. The bit-map is usually generated within the host computer and transferred to the printer in compressed data format. The compressed bit-map is expanded in the printer and transferred to a print engine, which is the portion of the printer that controls the paper movement, toner, and mechanical drive system which moves the paper, as well as the electronic circuitry which controls the printing process. The print engine receives the bit-map data and converts it into the appropriate voltages to create a printed image.

The printed page is comprised of individual dots, called pixels. On a typical laser printer, there may be 300, 600, or more pixels per inch. Each pixel is usually represented by a single data bit in the printer memory. As the laser print engine scans a line, the data bits corresponding to that line are read and the laser beam turns on or off depending on the logic level of the data bit stored in that memory location. At a resolution of 300 pixels per inch, a printer requires approximately one megabyte of memory to store the bit-map data file for an entire page. Some laser printers contain large memories and operate in a page mode, which means that the printer can store an entire page of data in bit-map form. Because of the large amount of memory required to store an entire page in bit-map form, some printers use a banding mode to reduce the mount of memory required. A printer with banding mode capability breaks the printed page down into a number of horizontal segments called bands. The printer accepts the bit-map data for only one band at a time thus reducing the memory requirement. When the printer has processed the data for the first band, it can accept data for the second band and so forth. For example, if the printed page is broken down into four bands, the memory requirements are reduced by a factor of four because the printer need only store the bit-map data for one fourth of the page.

Designing a computer-printer system involves the achievement of two basic goals. The first goal is that of device independence. In an effort to make the printer independent of system constraints of any particular host computer, manufacturers and programmers design printer drivers that attempt to be universal. If there is true device independence, the host computer does not need to know what type of printer is connected to the printer interface. The host computer typically transmits data to the printer system through a hardware interface such as a serial I/O port or a parallel printer I/O port. Prior art computer-printer systems attempt to achieve device independence by minimizing the host's knowledge of a particular attached printer and relying instead on a rather abstract data stream. As a result, transfer and processing of the data stream is often slowed to an inefficient pace, and throughput suffers.

As an example, a host computer may download a first character font set required for several pages of a document. Typically, computer systems of the prior art download an entire font even when only a few characters are needed for a particular printing task. The host computer will download an entire second character font set when the second font set (or part of the second font set) is needed. The second font set may be written into the memory space occupied by the first font set even though there may be room within the printer memory to retain the first font set for use when printing subsequent pages requiring the first font set. There is no communication from the printer to the host computer to advise the host computer of the current status of the printer resources.

The second goal is optimum performance of the printing process. Laser printers range from simple stand-alone printers coupled to a single computer and processing one or two pages of paper at a time to sophisticated printers with multiple paper trays and complex paper pathways coupled to a computer network and simultaneously processing many pages for multiple users. Computer systems must be capable of operating effectively with any type of printer.

Unfortunately, these first and second goals may come into conflict. The trade-off for attempting universal compatibility is that computer-printer systems are often extremely slow in processing data. Furthermore, host computers do have some awareness of the printer to which they are connected. Ironically, in an attempt to achieve these two goals, present computer-printer systems fail to achieve either goal. The host computer is aware of the type of printer to which it is connected, and yet the "universal" printer driver approach results in a slow, inefficient system where the host computer and printer often spend valuable computing time resolving conflicts that may not arise, such as page error recovery, rather than performing useful tasks. For example, prior art computer-printer systems retain the bit-map data file for an entire page until the printed page clears the last jam sensor on the laser printer. In the event that a page jams, the data is available and the page can quickly be reprinted. However, paper jams occur relatively infrequently in the printing process. Once the print engine begins to print a page, it takes approximately ten seconds for the page to clear the last jam sensor. The overall printing process is slowed significantly by waiting an extra ten seconds for each page to clear the last jam sensor before clearing the bit-map data file from the printer memory and processing the next page.

Prior art systems also delay feeding paper to the print engine until the entire page has been described because the selection of paper size may be made at any time during the page description. For example, the host computer could transfer a description of the entire page and the final description line could be the selection of letter size paper. There is no need to delay the paper feeding if the user is required to select the paper size at the beginning of the page description. Few, if any, print tasks are hampered by this requirement. The user generally knows the paper size and the print mode (i.e., simplex or duplex) before the prim process begins. Therefore, prior art systems waste valuable time by providing an unnecessary option.

Currently used printer languages have evolved from the printer languages used with dot matrix printers. While dot matrix printers are still in use, the use of laser printers is widespread and growing. Yet, the printer languages have attempted to deal with the increased use of laser printers by making minor modifications to printer languages oriented to the slower dot matrix printers. This evolutionary approach does not take advantage of the potential computing power available in laser printers.

The system architecture of prior art computer-printer systems has changed very little even though the printer hardware has evolved from simple "dumb" printers to sophisticated laser printers controlled by microprocessors. The typical prior art computer-laser printer system, shown in FIG. 1, has a device within the printer known as a parser. The parser accepts bytes of data from the host computer and organizes the bytes of data into tokens. Tokens are streams of data that are associated in a meaningful lexical context. For example, a data stream may be a binary bit-map transmitted in a compressed data format. The binary data is usually accompanied by a header and trailer instructing the parser how to process the data. The header/trailer are transmitted in ASCII bytes, each of which must be processed by the parser. The parser must accept and process every ASCII data byte, one byte at a time. As a result, the parser is a bottleneck to efficient data flow in a computer-printer system.

The parser processes every byte of data received by the printer and creates a display list within a memory in the printer. The display list is sorted by virtue of where the object is located on the page. Bitmaps in the display list are generally stored in an uncompressed format. Other objects such as text are rather brief. Therefore, a single, simple rectangle running around the circumference of the page will generally require one megabyte of storage. An imager translates the display list into a bit-map data file suitable for the print engine. The bit-map data file is stored in a frame buffer and transmitted to the print engine.

Another area in which prior art computer-printer systems are inefficient is that pages are often processed in an inefficient order. If the printer is operating in the duplex mode (printing on both sides of the page), the paper pathway taken by the page within the printer demands that side two of a page be printed before side one. However, prior art computer-printer systems demand that side one of a page be processed before side two. This means that side one of the page be processed completely and stored within the printer memory as a bit-map data file. Then, side two of the page is completely processed and sent to the print engine. The philosophy in prior art systems is that the user expects side one to be processed first. However, the user really only expects that the pages will appear in the proper order in the printer tray when the document is completely printed. There is no practical reason that the host computer should process the pages in any order other than the order in which the pages will actually be printed by the printer.

As noted above, prior art systems also fail to use the potential computing power available in modem laser printers. The older design dumb printers were little more than a data buffer and a print engine. The data processing was all done by the host computer and the printer printed the dot matrix data. Modern laser printers are microprocessor controlled and have computing power that may even equal that of the host computer. Prior art systems still tend to treat the printer as a dumb printer without the capability of performing any data processing. This is due, in part, to the attempt to achieve device independence, as described above. Other prior art systems give the printer responsibility for virtually all data processing. The result is that the combined computing power of the host computer and the printer is not utilized efficiently, and the overall printing process is slowed to an inefficient pace.

The attempts to achieve device independence and universal operation with all types of printers results in an inefficient printing process in which potential computing power is untapped and resources are wasted because the host computer and palmer do not communicate effectively with each other. Therefore, it can be appreciated that there is a significant need for a computer-printer system that allows effective communication between the host computer and the printer, and maximizes utilization of resources.

SUMMARY OF THE INVENTION

The inventive system is embodied in a host computer-printer system containing a resource assembler to examine a document and translate the document into a set of render primitives, while at the same time determining which resources are required to properly print the document. The dependencies between resources and portions of the document are made known to other portions of the system.

A resource loader uses the dependencies to determine a loading and releasing sequence in which resources are loaded into and released from a printer resource store. A resource scheduler controls the timing of the actual transfer of resources to the printer resource store and the deletion from the printer resource store. A resource executor converts the render primitives into a bit-map data file using the resources in the printer resource store. The print engine converts the bit-map data file into the voltages required to print the actual page.

In one embodiment the resource assembler determines whether the printer can convert the render primitives into bit-map dam files in real-time, and converts the render primitives into bit-map data flies if the printer cannot perform the conversion in real-time. The present invention uses load balancing to determine whether the printer or the host computer should process portion of the document. The load balancing is a dynamic process that may change from page to page or even within the page. The resource assembler in this embodiment explicitly emunerates the dependencies between resources, which gives the resource loader look-ahead capability which allows the resource loader to efficiently determine whether to retain a particular resource in the printer resource store for future use. The resource assembler constructs glyph sets as resources. Glyph sets are actively managed as a single resource. The resource scheduler determines when all of the resources required for a particular page of the document are present in the printer resource store, and generates an execute signal triggering the resource executor when all required resources are present in the printer resource store.

In another embodiment, the printer can communicate with the host computer over a bidirectional communications channel. In this embodiment, the resource loader may be located within the palmer, allowing the printer to manage its own memory. The printer can communicate status information concerning the resources present in the printer resource store and the amount of memory available in the printer resource store. The printer also specifies the sequence in which pages should be processed in order to maximize efficiency of the printing process.

In systems with bidirectional communications, the error recovery process may be moved from the printer to the host computer. The resource loader uses the dependency list to request resources required to reprint any portions of the document in which an error occurred.

The present invention may be used with printers operating in a page mode or in a banding mode.

DETAILED DESCRIPTION OF THE INVENTION

Figure 1:
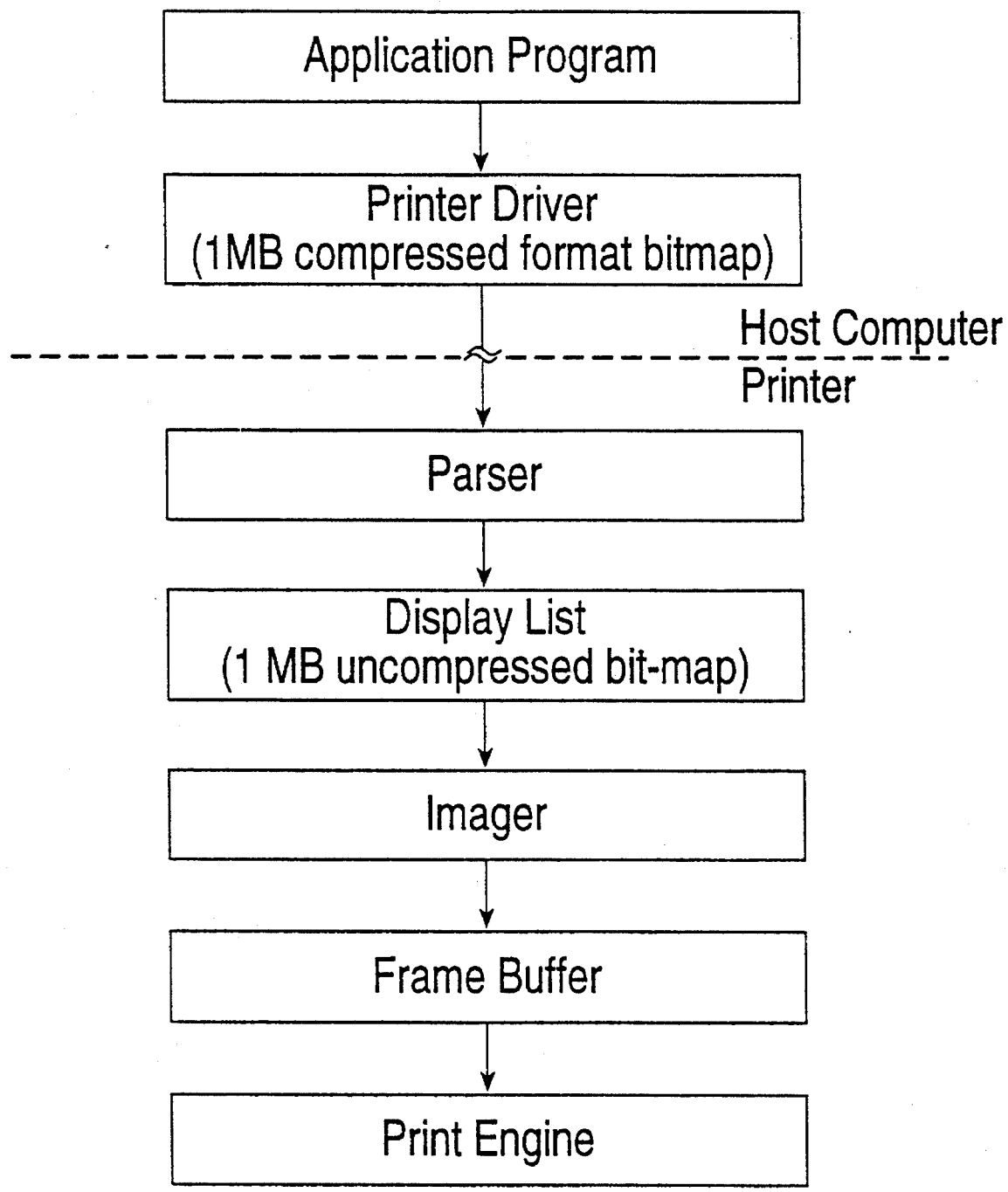
FIG. 1 depicts a typical prior an computer-laser printer system.

The present invention takes a revolutionary approach to host computer-printer interaction. It allows the cooperative effort of the host computer and the printer to dramatically increase the print speed of the printing process and decrease the return to application time. Return to application time is the time that the host computer requires to process a printing job and return to the application program that initiated the printing. Many prior art computer-printer systems are designed to execute computer code, rather than print pages. That is, the printer receives, translates, and executes code with the page being printed as a by-product of the code execution. Many systems of the prior art execute a large amount of code to print a single page.

As described above, prior an systems do not have an effective dialog between the host computer and the printer. Thus, the sophisticated computing capability of the modern printer is not utilized. In contrast, the present invention takes advantage of the computing power in the printer and is designed to allow free communications between the host computer and the printer. The present invention views the host computer and the printer as two parts of the same "system" which can cooperate with each other to more efficiently print documents. In the above example where two character font sets are required to print a document, the host computer of the present invention is aware that the printer could retain the first font set and thus will retain the first font set in the printer memory. Furthermore, the prior art host computer typically looks only at the current page being processed and does not look ahead to determine if the first font set may be required in the future and should be retained within the printer memory. As a result, the prior art host computer must repeatedly download the first font set if it is required for printing several pages (and may delete the second font set in the process). It should be noted that some prior art systems do have crude look-ahead capability, but it is very limited and does not efficiently utilize memory. In contrast, the present system will look ahead at the printing task to determine whether the first font set, or any other resource, should be retained in the printer memory and to determine when the first font set is no longer needed and can be released or deleted from the printer memory. Furthermore, the system of the present invention constructs subsets of character fonts when only a portion of a font set is required, which maximizes the use of available resources. Thus, the present invention takes a resource-oriented approach to printing.

While the description provides details of operation with a laser printer, the inventive system and method is applicable to any marking technology such as laser, thermal, impact, sublimation, ink-jet, or the like.

A resource is anything within the computer-printer system that occupies memory or is required to print a document. The document will be completely described using resources. The term resources will be explained in greater detail below. According to the principles of the present invention, the goal is to print the document quickly and allow the host computer to return to the application program in a minimum amount of time. This is accomplished by allowing open communication between the host computer and the printer so that the requirements of each part of the system and the available resources to accomplish the task are readily known by other parts of the system. The entire printing process is faster than prior art computer-printer systems, in part, because the computing power and available memory of the host computer and the printer are called into play.

The present invention may be used with a computer-printer system that has only one-way communication capability and uses a status line from the printer to the host computer to indicate that the printer is busy. Other computers or printers may have bidirectional communication, but cannot support full bidirectional communication at a data rate required by the present invention. The present invention will attempt to establish bidirectional communication, but will resort to one way communication if either the computer or printer cannot support bidirectional communication because the latency time is so long that it cannot efficiently support full bidirectional communication. However, many computer-printer systems have full bidirectional communication between the host computer and the printer. If a computer-printer system has bidirectional capability, the present invention has enhanced error recovery capability and the ability to shift some of the functions back and forth between the printer and the host computer depending on the particular printing task. This "load balancing" allows even greater increases in printing speed by allowing the print task to be handled by the portion of the computer-printer system that can most efficiently perform the task.

As previously discussed, a resource is virtually anything that is required to print a document. This may include character font sets, glyph sets, point tables, brushes, and user defined graphic images as well as the data that describes the page itself. A "font set" is a set of ASCII characters, usually stored as a bit-map, that define a particular character typeface such as Times-Roman, Helvetica, Courier or the like. Some printers have font sets stored in read-only memory (ROM) integrated circuits within the printer, while other computer-printer systems use "soft fonts" which are stored as bit map data files within the host computer and downloaded to the printer random access memory (RAM) when needed. Soft fonts allow greater flexibility in printing since the fonts generally reside on disk in the host computer and thus do not permanently occupy memory space within the printer. Still other computer-printer systems use font scaling technology, such as TrueType fonts, where the fonts are not stored as a bit map data file. Instead, the fonts are described by a set of equations which define the lines and curves of characters for each font type. The host computer or printer use these equations to construct a particular font character of any point size. The advantage of font scaling technology is that a single set of equations may be used to describe a font type for all point sizes whereas fonts that are stored as bit-maps can only be used for a single point size. For example, Times-Roman 4, Times-Roman 6, Times-Roman 8, and Times-Roman 10 are considered four separate fonts and each requires a separate bit-map data file to describe the particular font. In contrast, font scaling technology has a single set of equations that describe Times-Roman characters of all point sizes. The host computer or printer applies the equations and scales the equations for the selected point size so that multiple sets of bit-map data files are not necessary. The present invention works with either ROM stored fonts, soft fonts, or the font scaling technology.

A "glyph set" is similar to a soft font in that it comprises predefined characters stored in the host computer. However, it is different from a font set in that the predefined characters are not necessarily a complete character font set and may contain user defined characters, graphic symbols, or combinations of different typefaces from various character font sets. For example, a glyph set may be an equation containing numbers and mathematical symbols from several different font sets, as well as some user defined graphic symbols. A particular glyph set may be large enough to contain a complete character set or may be as small as a single character. Another example of a glyph set is a form, such as a tax return or a data entry form, that may be used within a document. The present invention will create the form and store it as a glyph set. If the form is used again in a document, the entire form is available as a glyph set.

Some prior art systems use glyph sets in a limited manner. Prior art host computers may assemble a subset of a character font to download to the printer. If a new character is needed, the prior an host computer can incrementally download only the needed new character and append it to the already downloaded glyph set. However, prior an systems do not actively manage the glyph set resource. Prior an systems generally clear glyph sets at the start of a new page without regard for future need for the glyph set. This forces the prior an host computer to construct new glyph sets if they are needed on the new page. The newly constructed glyph set may not be the same as the previous glyph set, and the periodic reconstruction and downloading of glyph sets consumes extra time in the printing process. In addition, prior an systems require a great deal of data to accompany the glyph sets to indicate which characters are present in the glyph set.

In contrast, the present invention constructs a glyph set from the available resources and actively manages the glyph set as a single resource. The term "glyph set", as used in the present invention, refers to a resource that comprises portions of other resources such as fonts. For simplicity, glyph sets will be retorted to as resources. The present invention assembles the glyph set until it reaches a predetermined size, but may not immediately transfer the glyph set to the printer. The assembled glyph set is treated as a unit that is transferred to the printer when needed, and is deleted from the printer as a unit when it is no longer needed. The glyph set is actively managed based on the future need for the glyph set and the available space in the printer resource store rather than the prior an approach of clearing the printer memory at the start of a new page. The glyph set of the present invention also contains a header as a "table of contents" indicating which characters are in the glyph set, but the header is much smaller in size than prior art headers because the glyph set does not change once it is constructed.

A "point table" is a table of coordinates points used to define a graphic object. For example, a graphic object such as a rectangle may be defined by the coordinates of the four corners. Similarly, a cubic Bézier curve is defined by four control points. The point table stores the coordinates of the control points. To print a smoother curve on the laser printer when a Bézier curve is rendered, the curve rendering process is often performed using a high resolution that exceeds the actual resolution of the printer. The lines that are calculated to render the curve may be shared when the object is actually printed on the printer thus creating a smoother looking image. If the higher resolution calculations are performed, the point table may contain the coordinates of all the line segments used to render the Bézier curve. The point tables may also be created by the user in an application program by using a mouse or other pointing device to draw, entering coordinates, using a digitizing tablet or the like.

A "brush" is a graphic pattern typically used to fill the interior of a graphic object such as a rectangle or a circle. A brush is the smallest repeating pattern that will be repeated to fill in the entire interior of the graphic object. For example, when an object such a circle is created, the draw primitive will instruct the printer to create the circle and fill the interior with a particular graphic pattern. A cross-hatch pattern, for example, may comprise a series of small "x" shapes that can be repeated to fill in the entire object. The system of the present invention stores commonly used brushes within the printer and creates additional various brushes with the host computer.

The data that describes the printed page is also considered a resource. The host computer contains a description of the page that may have been created by an applications program such as a word processor, a spread sheet, a data base or the like. The present invention translates the page description into a set of draw primitives and interrelates the draw primitives with the other resources required to print the document. The details of the translation process will be described below.

Figure 2:
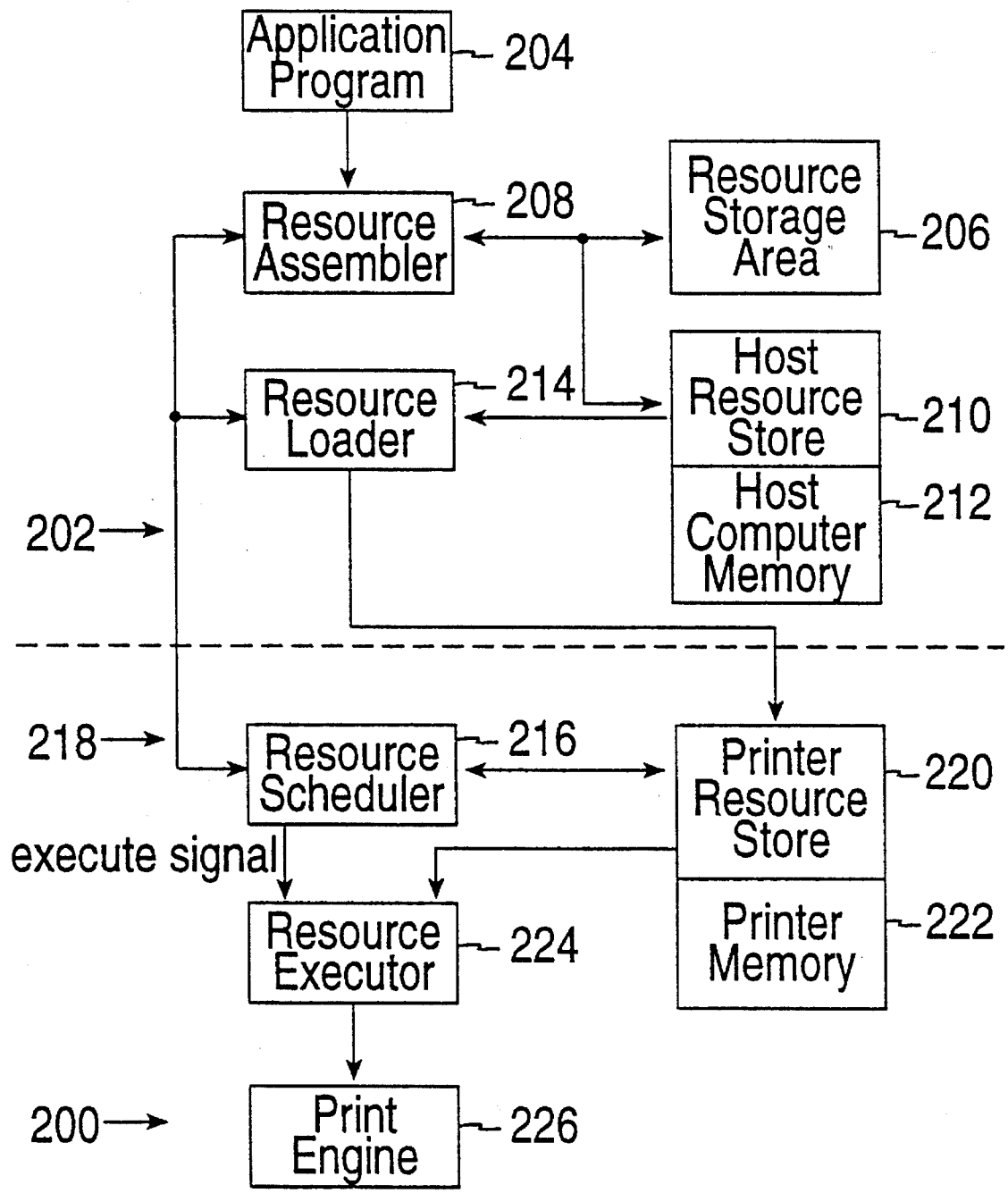
FIG. 2 is a functional block diagram of the computer-printer system of the present invention.

As shown in the functional block diagram of FIG. 2 for purposes of illustration, the present invention is embodied in a computer-printer system 200. As with the prior art, a host computer 202, executes an application program 204 containing a document that is to be printed. As previously described, resources are stored in various areas of the host computer 202, such as a host computer memory 212 which may include a hard disk memory. The various storage areas will genetically be referred to as the resource storage area 206. The host computer 202 contains virtually all resources available for printing documents. Some ROM stored fonts and commonly used resources may be stored in the printer throughout the printing task. A resource assembler 208 examines the document to determine which resources are required to prim the document. As the resource assembler 208 examines the document, it selects the resources which will be required to print the document and translates the document into a set of draw primitives that describes the printed pages. The selected resources and draw primitives are stored within a host resource store 210. The host resource store 210 may be part of the host computer memory 212 or any other suitable storage location. The resource assembler 208 defines dependencies between a document and a subset of the resources which are required to print the particular document. The resource assembler 208 communicates the dependency information to a printer 218 which is attached to the host computer 202. The resource assembler 108 may also receive information from the printer 218 as to the most efficient sequence for printing the document as well as status information as to what resources are currently in the printer 218.

The printer 218 contains a printer resource store 220 which has the capacity to store a limited number of resources downloaded from the host resource store 210. The printer resource store 120 may be part of a printer memory 222 or any other suitable storage location. A resource loader 214, shown in FIG. 2 as being a part of the host computer 202, uses the dependencies created by the resource assembler 208 to determine the order in which resources, including draw primitives, will be transferred to the printer resource store 220. The resource loader 214 also determines the order in which resources can or must be released from the printer resource store 220 to make room for new resources. The draw primitives transferred by the resource loader 214 instruct the printer 218 to utilize specified resources to create a graphic symbol, draw a graphic object, print an alphanumeric character, or the like.

A resource scheduler 216, shown located within the printer 218, may alternatively be located within the host computer 202. The resource scheduler 216 controls the timing of printer operation and the actual timing of resource transfer. The resource scheduler 216 also controls the timing of the deletion of resources from the printer resource store 220 and of requests to transfer particular resources from the host resource store 210. When all of the resources necessary for a particular page of the document are in the printer resource store 220, the resource scheduler 216 generates an execute signal to indicate that the subset of required resources are available for printing the present page. A resource executor 224, upon receiving the execute signal from the resource scheduler 216, follows the commands of the draw primitives and uses the resources from the printer resource store 220, to create a bit-map data file of the document page currently being processed. The resource executor 224 transfers the bit-map data file to a print engine 226 which in turn causes the document page to be printed.

It should be noted that the physical location of many of the above-described resource blocks is not critical to the operation of the present invention. If in a computer-printer system 200 the printer 218 is a laser printer with a great deal of computing power, all of the resource blocks described above could be located within the printer and still utilize the inventive aspects described herein. For example, the resource scheduler 216 may be located within the host computer 202 or the printer 218, as noted above. Similarly, the printer resource store 220 may be alternatively located within the host computer 202. If the host computer 202 is operating in an environment such as Windows™, the printer resource store 220 may be part of the despooler function that operates in the background while the application program operates in the foreground. The principles of the present invention still apply because the printer resource store 220 is still limited in size and operates in the same manner as it would if the printer resource store was located within the printer 218. The background operation is transparent from the perspective of the application program. Thus, the actual location of the printer resource store 220 is not critical. As a practical matter, the host computer 202 will generally have more computing power than the printer 218. Therefore, the resource blocks described above are allocated to either the host computer 202 or the printer 218 depending on the relative computing power of each, and the availability of a bidirectional communications channel between the host computer and the printer.

The host computer 202 stores the resources in various locations within the host computer 202 or in the printer 218 (in the case of ROM stored character fonts). For example, glyph sets are assembled by the resource assembler 208 and stored as bit-map data files within the host resource store 210. The computer-printer system 200 also stores point tables representing various graphic objects within the host resource store 210. The point tables are loaded into the host resource store 210 by the resource assembler 208, which may also convert the point table to a data format used by the present invention. In other cases, the data describing a graphic object may be stored by an applications program in a format other than a point table. The resource assembler 208 creates a point table in the appropriate data format and stores the created point table in the host resource store 210. In contrast, soft fontssets are typically stored as data files on a hard disk (not shown). If the resource assembler 208 determines that a particular soft font character or brush is required, the resource is loaded into the host resource store 210.

In both the prior art and the present inventive computer-printer system 200, the application program 204 generates a document description that may reside with the host computer memory 212 or any other suitable storage location such as a hard disk (not shown). The application program stores the document using a Page Description Language (PDL), which may vary from one application program to another. In prior art systems, an assembler within the host computer converts the PDL into a set of draw primitives, which may generically be called a Render Primitives List (RPL). The RPL may contain alphanumeric characters, graphic objects, or combinations of the two. In some prior art systems, the host computer translates the RPL into a bit-map data file of the document page, in a process called rendering the primitives list. It is the bit-map data that prior art host computers transfer to the printer. Other host computers of the prior art convert the RPL into an intermediate level language such as PostScript™ or PCL™.

Some systems of the prior art actually have a portion of the system that functions in a manner similar to resource assemblers. The prior art assembler is within the host computer and converts the PDL into RPLs. The parser, described above, acts as a second resource assembler in the prior art and receives the RPLs and constructs the intermediate data structures that will be required to translate the intermediate level language into a corresponding bit-map. The parser is designed to process code and not specifically designed to produce a printed page.

In contrast, the computer-printer system 200 of the present invention uses only a single resource assembler 208, which is typically located within the host computer 202. The resource assembler 208 is only concerned with producing a printed page, and the code created by the resource assembler is designed to efficiently print documents. The resource assembler 208 examines the document and converts the PDL to RPLs while determining which resources are required to print the document. The resource assembler 208 gathers the selected resources and places them into the host resource store 210 along with the associated RPLs. The present invention need not place the resources and RPLs in the host resource store in a particular format that associates the resources with specific RPLs. In fact, the actual data structure and format is not important for the use of the present invention. Many different formats well known to those of ordinary skill in the art are acceptable for the proper operation of the present invention. A list stating the dependencies and location of resources and RPLs is all that is necessary. This list may take the form of a series of pointers, indicating locations where the resources and associated RPLs are stored. The list may even be implied by a predetermined sequence of execution of RPLs as will be discussed below.

Figure 3A:
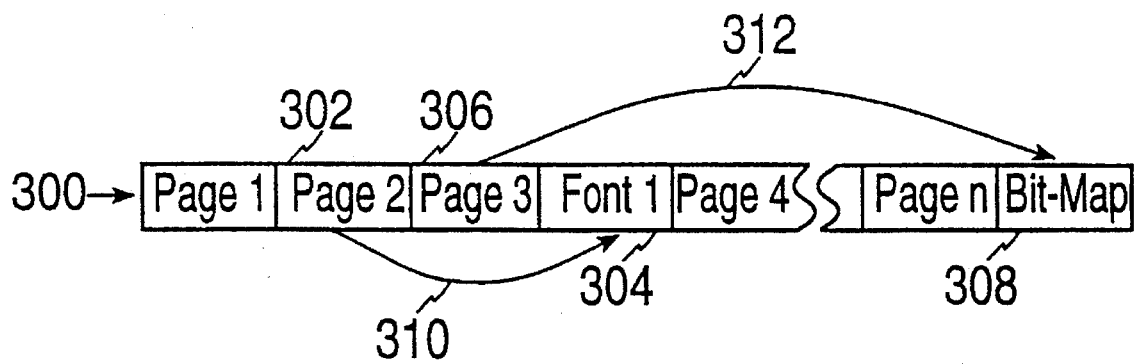
FIG. 3A illustrates a manner in which an unbounded document may be represented.

When resources are stored within the host resource store 210, they are considered unbounded since there is no constraint on the size of the data file containing resources and KPLs nor are there constraints on the sequence in which the resources and KPLs are stored. For example, a document may be created by the user and subsequently edited to include a graphics chart near the beginning of the document. The applications program will not recreate the entire document file to insert the graphics chart. Rather, the applications program will place the graphics chart at the end of the document file and insert a pointer in the document at the point where the graphics chart should be inserted. The pointer points to the location of the graphics chart. This common technique uses backwards pointing, that is the insertion point in the document points backward to a later position in the document file where the graphics chart is stored. This technique is shown graphically in FIG. 3A where a document 300 has N pages. Page two of the document, indicated by the reference numeral 302, requires Font1 304, while page three 306 of the document 300 requires the graphics chart, which is represented by a bit-map 308. Note that Font1 304 and the bit-map 308 are stored after the locations on page two 302 and page three 306, respectively, in the document 300 where the font and bit-map are required. The data pointers 310 and 312 point to the locations 304 and 308, respectively, where the resources are required. Since the document is unbounded, the computer has access to the entire document and can utilize pointers in the manner described above.

Figure 3B:
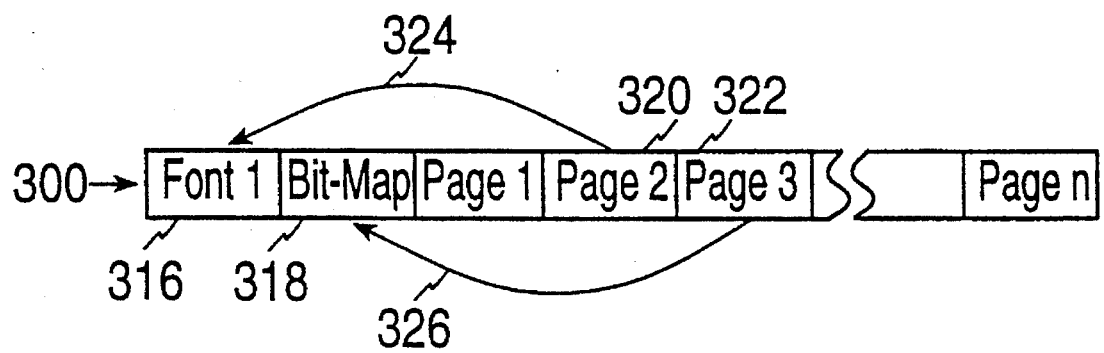
FIG. 3B illustrates the manner in which the unbounded document of FIG. 3A may represented in a bounded fashion.
Figure 3C:
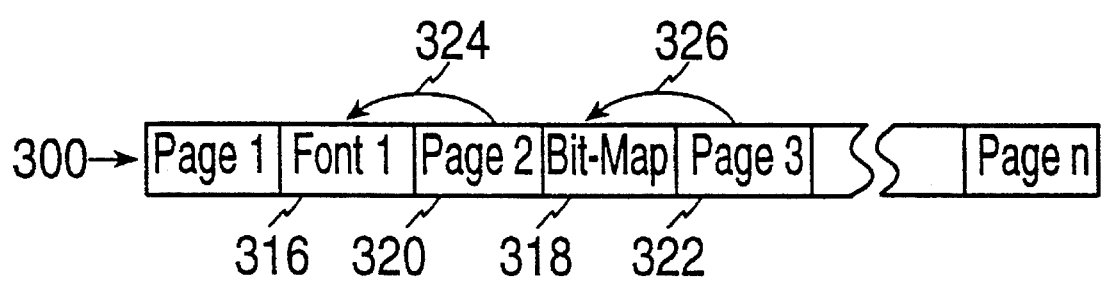
FIG. 3C illustrates an alternative configuration of the bounded document of FIG. 3B.

However, when printing the document, the printer will not have access to the entire file at once. Therefore, the document is considered to be bounded by both the size constraints of the printer resource store 220 and the sequence in which the document is stored. The required resources must be present in the printer before they are actually needed or the printer will be delayed or may not be able to print a particular page at all. The document must be assembled in a bounded fashion as indicated in FIG. 3B where the same document 300 is represented as a bounded document. The required font 316 and the bit-map 3 18 appear in the document 300 before they are actually required for page two 320 and page three 322. The pointers 324 and 326 point to the locations 316 and 318, respectively, where the resources are stored. Thus, the pointers 324 and 326 are forward pointing to a location in the document 300 where the resources are stored. In this manner, the resources are always present before they are required for printing the document. Note that it is not necessary that the resources be located at the beginning of the document. It is only necessary that the resources be located before the place in the document where the particular resource is required. For example, the document 300 is alternatively shown in bounded fashion in FIG. 3C where Font1 320 is located just in front of the location 320 where the resource is needed. The pointer 324 indicates the location of the required resource. Similarly, the bit-map 318 is located just in front of the location 322 where it is required, and the pointer 326 indicates the location where the resource is required.

It should be noted that, while the host computer 202 generally has more memory than the printer 218, there is a limit to the amount of host computer memory 212 that can be allocated to the host resource store 210. Therefore, the host resource store 210 does not contain all possible resources stored on the computer. Rather, the host resource store contains only the resources required to print the particular document as well as the RPLs describing the document. When a particular portion of the document has been printed, the resource required for the particular portion of the document are deleted from the host resource store 210. Some resources may be used only once in a document and may be deleted immediately upon completion of printing that portion of the document. Other resources, such as glyph sets, that may be used frequently are stored within the host resource store 210 until no longer needed for a document.

Because the host computer 202 typically has more memory than the printer 218, the host computer can allocate more of the host computer memory 212 to use for a host resource store 210. The printer 218, having less memory, has a correspondingly smaller printer resource store 220. The printer resource store 220 is not sufficiently large to hold the entire set of resources that the host resource store 210 contains. Thus, resources must be downloaded from the host resource store 210 to the printer resource store 220 when needed by the printer 218. The printer 218 must make efficient use of the resources within the printer resource store 220, and delete resources that are no longer needed or can be quickly reloaded from the host resource store 210. Thus, the host resource store 210 is loaded only a single time with the resources required to print the document, while resources may be downloaded and released from the printer resource store 220 many times during the course of printing the document. In order to determine the most efficient use of resources, the computer-printer system 200 of the present invention examines the entire document to determine how to allocate resources in the most efficient manner.

Referring again to FIG. 2, the detailed operation of the computer-printer system 200 is provided. The resource assembler 208 converts the PDL into a set of RPLs and determines which resources are required for the present printing task. As the print task begins the resource assembler 208 begins to look at the first band (if the printer 218 is operating in the banding mode) or page (if the printer 218 is operating in the page mode) of data describing the surface to be printed. For purposes of this application, the unit size of the document being processed, whether a band or a page, will be referred to as a data block. The resource assembler 208 selects resources from the resource storage area 206 which will be required to print the document. The resource assembler 208 also determines the dependencies of these resources to particular data blocks. For example, the resource assembler 208 may determine that a particular font type is required for a formula on the first page and that another font type is required for the remainder of the page. In addition, a graph may be printed on the page which will require certain graphics resources such as a point table and a brush.

The resource assembler 208 creates a list that explicitly states the dependencies and the data block for which these resources are required. It should be noted that the list need not be in the form of a list. As stated above, the list may be in the form of pointers to memory locations, or may even be implicitly defined by the sequence in which RPLs are created by the resource assembler 208. For example, if a programmer writes a program that creates and immediately executes the first RPL, there is no expressed list that is created and stored in the host resource store 210. However, there is an implied list that is specified by the order in which the tasks are created within the RPL. What is important for efficient operation of the present invention is that the resource assembler 208 determines the dependencies and makes other resource blocks aware of the dependencies.

There are two different types of dependencies specified by the resource assembler 208. The first type of dependencies are operand dependencies which relate the required resources to a particular data block as described above. The second type of dependencies are execution dependencies, which specify the sequence in which RPLs are processed. Some prior an systems may not satisfy the execution dependencies when they print a document. For example, some prior art systems separate text from graphics and process the two independently. The printed page, therefore, may not be what the user sees on the display screen. Thus, prior art systems do not always result in "what you see is what you get" (WYSIWYG). In contrast, the computer-printer system 200 always satisfies execution dependencies, even if they are implied in the sequence of RPLs as described above because the system processes the entire data block rather than breaking a data block into text and graphics portions.

Some execution dependencies may be specified by the printer 218 if there is bidirectional communication between the printer and the host computer 202. As will be explained in greater detail below, the printer may specify the order in which pages or bands of data should be processed in order to maximize efficiency of the printing process. If execution dependencies are specified by the printer 218, the resource assembler 208 will comply with those dependencies. The resource assembler 208 may also generate its own execution dependencies if there is a specific drawing order that must be maintained within a data block. For example, the printer 218 may instruct the resource assembler 208 to process page two of a document first, and to process page two from the bottom to top. This is an execution dependency that is specified by the printer 218. However, if there are overlapping graphic objects on page two, the drawing order of those objects must be specified so that the printed page will appear to have the objects overlap in the intended manner. The resource assembler 208 determines the execution dependencies that specify the drawing order. Thus, the resource assembler 208 creates a list that states both operand dependencies and all execution dependencies (whether specified by the resource assembler 208 or the printer 218 ).

As discussed above, the list for some dependencies may be implicit in the sequence of draw primitives within a band or page. For example, the computer-printer system 200 could always execute the first RPL first, thus creating an execution dependency that does not have to be explicitly stated. For maximum efficiency, particularly with sophisticated printers and bidirectional communications, the presently preferred embodiment of the computer-printer system 200 does not use implied dependencies since they can unnecessarily limit the execution to a less efficient sequence of tasks. The above examples of using implicit dependencies are given only to show that the broad principles of the present invention may be used to improve the overall efficiency of the printing process without requiring the use of all inventive aspects of the computer-printer system 200. In the presently preferred embodiment, the resource assembler 208 explicitly communicates dependencies to other components of the system, including the resource loader 214, the resource scheduler 216, and the printer 218.

If the computer-printer system 200 has bidirectional communications capability, the printer 218 can send information to the resource assembler 208 as to the current status of the printer resource store 220. Such status information includes which resources may already be present in the printer resource store 220 and how much space is available in the printer resource store. In addition, the printer will instruct the resource assembler 208 as to the most efficient sequence for printing the document. This is an important process in large sophisticated laser printers that have duplexing capability and can print from multiple paper trays. In such printers, there can be as many as ten sheets of paper moving through the print engine simultaneously. Pages that are printed on both sides of a sheet of paper (duplex mode) are processed from top to bottom on one side of the paper and from bottom to top on the other side of the paper. Different page sizes require different lengths of time in the print engine. Modes such as the landscape mode may require more print engine processing time than other modes. Pages may actually pass each other inside the print engine of a sophisticated laser printer. As a result, the most efficient sequence for processing the pages may not be the numerical order of the pages (i.e., page 1, 2, 3, . . . ). The computer-printer system 200 of the present invention allows the printer 218 to determine that most efficient sequence for printing the document and to communicate that information to the resource assembler 208. In systems that only have one-way communications, the printer 218 cannot communicate status information or print sequence instructions. However, the resource assembler 208 still communicates the explicit dependencies to the printer 218 so that the printer 218 will know when it may delete resources from the printer resource store 220. If only one-way communication is available, the resource assembler 208 still knows the status of the printer resource store 220 because the host computer 202 manages the printer memory 222 in the one-way mode. Thus, the resource assembler 208 knows which resources are already in the printer resource store 220 at the start of a printing task.

As previously discussed, the resource executor 224 typically converts the RPLs to bit-map data to be printed by the print engine 226. Once, the print engine has started, it cannot stop printing the page or an error will occur. Therefore, once the print engine has been committed, the RPLs must be converted to bit-map data in real-time or have been previously converted to bit-map data. OF course, certain printers, such as dot matrix printers and ink-jet printers, can stop in the middle of a page without creating an error. The resource assembler 208, knowing the current status of the printer resource store 220 and the overall processing power of the printer 218, examines each data block to determine if the printer 218 can convert the RPL for the data block into a bit-map in real-time as the print engine 226 is running. If the printer cannot convert the RPL for the data block in real-time, then the resource assembler 208 will instruct the host computer 202 to process the RPL into a bit-map and transfer the bit-map to the printer 218. Alternatively, if the printer memory 222 is sufficient to store a bit-map data file for the entire page, the resource assembler 208 may instruct the printer 218 to convert the RPL into a bit-map data file and store the bit-map within the printer memory 222 until the print engine 226 is committed. The decision as to which part of the computer-printer system 200 will convert the RPL into a bit-map depends on the relative complexity of the conversion task and the relative processing power of the processors within each of the parts of the system. In the presently preferred embodiment, the resource assembler 208 consider three factors in determining which portion of the computer-printer system 200 will process the data. Those factors are:

1. The length of time required for the host computer 202 to process the RPL into bit-map data;

2. The length of time required for the printer 218 to process the RPL into bit-map data; and 3. The length of time required on the communication channel to transfer the RPL or the bit-map data.

In other words, the resource assembler 208 calculates the time required for the host computer 202 to process the RPL for a particular data block into a bit-map data file plus the time required for the communication channel to transfer the bit-map data file to the printer 218 and compares it to the time required for the communication channel to transfer the RPL to the printer plus the time required for the printer to process the RPL into a bit-map data file.

The computer-printer system 200 also performs load balancing by shifting the data processing back and forth between the host computer 202 and the printer 218. The resource assembler 208 will select the host computer 202 or the printer 218 to process the data block depending on which part of the system can process the data block most efficiently. For example, if a particular task requires the drawing of a large number of lines on the page, and the processor of the host computer is twice as fast as the processor of the printer, the host computer 202 will probably be instructed to process the data. On the other hand, if the conversion is relatively simple, and the printer 218 has the memory capacity to store the bit-map, the processor of the printer may be instructed to process the data leaving the host computer processor free to process the next data block. It should be noted that this calculation is a dynamic process that may vary from one data block to another. The printer 218 may process one data block and the host computer 202 may process the next three data blocks. The overall goal is to produce the document in the most efficient manner. The computer-printer system 200 of the present invention allows this by using the potential computing power of both the host computer 202 and the printer 218.

The load balancing is based on a variety of parameters such as the relative computing power of the host computer 202 and the printer 218, the speed of the data communications channel, the relative sizes of the host resource store 210 and the printer resource store 220, the complexity of the printing task, and the tasks currently being performed by the host computer 202 and the printer 218. As previously stated, load balancing is a dynamic process in which the resource assembler 208 may assign some pages of a document to the host computer 202 and other pages to the printer 218 for processing based on the parameters discussed above.

The load balancing may even shift data processing responsibilities between the host computer 202 and the printer 218 within a single page. An example of different portions of the computer-printer system 200 processing the same page may occur when a particular page of a document contains two overlapping graphics objects, such as circles. The resource assembler 208 may send the PDL description of the first circle to the printer 218 because the printer is not currently printing. Therefore, the printer 218 will have the time to translate the PDL for the first circle. The host computer 202 may translate the PDL for the second circle because the host computer 202 has more computing power than the printer 218, and the printer 218 is already busy translating the first circle. Thus, the resource assembler 208 has used load balancing to split data processing responsibilities between the host computer 202 and the printer 218.

As previously stated, a resource that is required for a particular data block of the document creates a dependency within the computer-printer system 200 for a particular resource for that particular data block. The dependencies may vary from one data block to another. The resource assembler 208 explicitly states the dependencies so that the printer 218 knows which resources are required for a particular data block. Thus, the printer has a son of "menu" of resources relating the required resources with each of the data blocks. With bidirectional communications, the printer 218 can manage its own memory because the explicit dependencies between data blocks and resources have been provided. The printer 218 uses the menu of explicit dependencies to request resources from the host resource store 210 in a manner that maximizes efficiency of the printer resource store 220. For example, the explicit dependencies may state that one data block requires a particular font set and a particular glyph set, while the next data block requires the same font set but a different glyph set. The printer 218 may be able to hold all three resources (the font set and two glyph sets) in the printer resource store 220 at one time. Therefore, the printer 218 will request all three resources.

A more difficult aspect of resource management is deciding which resources should be deleted from the printer resource store 220. If printing a particular data block requires a resource so large in size that other resources must be deleted from the printer resource store 220, the printer 218 can decide which resource or resources to delete from the printer resource store 220 and when to request resources back from the host computer 202 for future data blocks. Furthermore, if error recovery is required, the printer 218 knows which resources are required to recover the lost pages and can request the necessary resources from the host computer 202 if necessary resources have already been deleted from the printer resource store 220.

The previous discussion is applicable when there is bidirectional communication between the host computer 202 and the printer 218. If there is only one-way communication available, the printer memory 222 is managed by the host computer 202. In that case, the host computer determines the sequence in which resources will be loaded into or deleted from the printer resource store 220 and when to load and delete the resources. Even though the printer 218 cannot manage its own memory with one-way communication, the present invention still represents an improvement in performance over the prior art because of the elimination of the parser and the addition of portions of the computer-printer system 200 such as the resource assembler 208 and the host and printer resource stores 210 and 220. In the computer-printer system 200 of the present invention, the resources may be loaded and released from the printer resource store multiple times in the course of printing the entire document. The job of determining which resources should be in the printer resource store 220 is performed by the resource loader 214 and will be described in detail below.

The resource assembler 208 examines the document several data blocks ahead of the resource loader 214 to generate resources for future data blocks. This allows the resource loader 214 to look ahead and determine the most efficient allocation of resources. Some resources may be used in many data blocks throughout the document and thus have dependencies throughout the document. It may be more efficient to retain these resources within the printer 218 throughout the printing process, depending on the available space within the printer resource store 220. A second resource, for example, may be needed only once in the middle of a document. In that case, the second resource may not be loaded until later when some other resource is no longer needed by the printer 218 and more memory is available within the printer resource store 220. After the second resource is used once, it may be deleted from the printer resource store 220 to make room for other resources.

The determination of how far to look ahead is a dynamic process. For example, at the start of a document, the goal is to get the print engine 226 started. Therefore, the resource assembler 208 will have limited look ahead operation in order to get resources transferred to the printer 218 as soon as possible. However, while the printer 218 is processing the first data blocks, the resource assembler can look ahead to future data blocks and select resources for the host resource store 210 as well as construct RPLs for future pages. Ideally, the resource assembler 208 can look ahead to examine the entire document before any printing occurs. However, the desire to start the print engine 226 limits the initial look ahead capability. There is a practical limit to the amount of look ahead capability a system should have. The desire to minimize the use of host computer memory 212 so that other applications programs may run also limits the ability of the resource assembler 208 to look ahead. The goal is to keep the prim engine 226 moving as efficiently as possible. The actual number of pages that the resource assembler 208 looks ahead depends on such factors as the total length of the document, the current page of the document being processed by the print engine 226, and the complexity of the document. The look-ahead capability of the resource assembler 208 enhances the ability of the resource loader 214 to control the flow of resources to the printer resource store 220.

As an example of the operation of the resource assembler 208, consider that a particular page of text requires portions of five different font sets and a point table (to draw a Bézier curve) to print the page. The resource assembler 208 examines the page and creates a list of explicit dependencies. The resource assembler 208 communicates the dependencies to other portions of the computer-printer system 200 as described above. At the same time, the resource assembler 208 also begins to assemble the host resource store 210 which will contain the required resources and the RPLs describing the page. Note that in the bidirectional mode, the resource assembler 208 will receive information from the printer 218 as to the sequence in which the data blocks will be processed. For simplicity, assume that the resource assembler 208 will process the data blocks for the page from top to bottom. There will be a single RPL if the printer 218 is operating in the page mode, while there will be a different RPL for each band if the printer is in the banding mode. The RPL will describe the data block (page or band) in a format that will tell the printer 218 to print a particular sequence of characters at a particular point on the page. The computer-printer system 200 uses this information to construct a description of the character sequence and store the description in the host resource store 210. The term "construct a description" may range from loading a bit-map of the character sequence from a storage location within the host computer 202 to using font scaling technology to construct the bit-map of the character sequence from a set of equations. The resource assembler 208 may store an entire font if so many characters from that font are required that it is more efficient to transfer the entire font set. On the other hand, if only a limited number of characters are required, the resource assembler 208 may open a glyph set to store only the required characters.

In the present example, the first font set may be transferred in its entirety. The only required characters from the second font set may be numbers and mathematical symbols for an equation. The resource assembler will open a glyph set to store the characters for the equation. The glyph set may remain open because the next portion of the page requires a limited number of characters in italics (font number three). It should be noted that the size of a glyph set is dynamically variable. For example, at the beginning of the printing operation, the goal is to get the print engine 226 to work as quickly as possible. To that end, the resource assembler 208 may use small glyph sets for the first data blocks of the document so the glyph sets may be transferred to the printer resource store 220 as soon as possible. This gives the print engine 226 something to work on while the resource assembler 208 assembles resources for subsequent data blocks. The size of subsequent glyph sets is generally determined by parameters such as the size of the printer resource store 220 and the rate of data transfer between the host computer 202 and the printer 218. The resource assembler 208 will keep the glyph set open until it reaches a predetermined size.

As previously described, glyph sets may contain characters from different font sets. Conversely, characters from the same font set may be stored in different glyph sets because of the dependencies. For example, some of the characters used in the mathematical formula described above may be used in a second equation printed in a subsequent data block. The second equation may also use additional characters from the second font set as well as characters from fourth and fifth font sets. The resource assembler 208 may construct a second glyph set that contains only the additional characters required for the second equation. When the resource executor 224 processes the RPLs and resources into a bit-map data file, it will use the characters from both glyph sets to construct a bit map for the second equation. The RPL for placing a glyph set is in a format that identifies which glyph set and which character is being placed at a particular position on the printed page. The RPL for the second equation of the example may have the following sequence:

Glyph set 1, character 1;

Glyph set 1, character 2;

Glyph set 1, character 3;

Glyph set 1, character 12;

Glyph set 2, character 1;

Glyph set 2, character 2;

Glyph set 1, character 17;

Glyph set 2, character 3;

Glyph set 2, character 4;

Glyph set 2, character 4;

Glyph set 2, character 5;

Glyph set 2, character 6; and

Glyph set 2, character 7.

Note that the use of both glyph sets in a single RPL necessitates having both glyph sets in the printer resource store 220 at the same time. If the first glyph set has been deleted from the printer resource store 220, the resource loader 214 determines that the first glyph set must be reloaded from the host resource store 210.

The resource scheduler 216 controls the timing of the request so that the printer resource store 220 does not overflow and so that the resources are available in the printer resource store in a timely manner. Prior art systems download entire fonts and do not attempt to manage the printer memory. This can result in memory overflows where the print task cannot be completed. Even systems that can perform incremental downloading, as described above, do not attempt to manage the printer memory except to periodically clear the downloaded fonts. In contrast, the computer-printer system 200 of the present invention saves time and printer memory by assembling characters into glyph sets because only the required characters are transferred to the printer resource store 220, and the glyph set resource is actively managed as described above. Thus, the overall efficiency of the printing process is enhanced.

To summarize the operation of the resource assembler 208, the resource assembler determines the resource dependencies, communicates that information to other portions of the computer-printer system 200 and processes the document description in the most efficient manner. The resource assembler 208 also creates RPLs describing the data blocks and stores the RPLs and resources within the host resource store 210.

The resource loader 214 is responsible for determining the sequence in which resources will be loaded into and released from the printer resource store 220. The resource loader 214 always has access to the system dependencies determined by the resource assembler 208 so that the most efficient sequence of loading and reloading resources can be determined. The resource loader 214 may be located within the host computer 202 or within the printer 218 depending on the communication capability of the computer-printer system 200. If there is only one way communication from the host computer 202 to the printer 218, the resource loader 214 always resides in the host computer 202. Thus, the printer memory 222 is managed by the host computer 202. However, if there is bidirectional communication capability, the resource loader 214 may reside in the printer 218 to allow the printer to manage its own memory. The resource loader 214 controls the transfer of both the RPLs and the resources to the printer 218.

As noted above, the host resource store 210 is large enough in size that resources assembled by the resource assembler 208 are loaded into the host resource store only a single time. The host resource store 210 is not concerned with the size of the resources or the constraints imposed by the size of the printer resource store 220. On the other hand, the printer resource store 220 is limited in size, and the resources are constrained by the size limitation. To effectively manage the printer resource store 220, the resource loader 214 looks at the size of each resource already in the printer resource store 220 and at the resource dependencies (previously determined by the resource assembler 208) and determines the order in which the resources are to be loaded into the printer and released from the printer so that the printer resource store 220 does not run out of space. Thus, the resource loader 214 may load and release a particular resource many times during the course of a printing task.

It should be noted that the resource loader 214 may release a particular resource when it is no longer needed. The printer 218 may not immediately delete the particular resource from the printer resource store 220 because the resource may still be needed within the printer 218. Since the host computer 202 and the printer 218 operate asynchronously, the release of a resource by the resource loader 214 may not immediately cause the deletion of the resource from the printer resource store 220. Thus, the terms "releasing" and "deleting" a resource are not synonymous. A resource is released when the resource loader 214 determines that a resource should be eliminated from the printer resource store 220. From the perspective of the resource loader 214, the resource is no longer present in the printer 218. The resource loader 214 will then specify the next resource to load or release. A resource is deleted when the printer 218 no longer requires the resource within the printer and actually deletes the resource from the printer resource store 220. The resource loader 214 is only interested in the size of each resource and whether it makes sense, from an efficiency perspective, for a particular resource to be present in the printer resource store 220. The resource loader 214 keeps track of the size of the printer resource store 220 and the available space therein, the current state of the printer resource store 220 (i.e., which resources are present in the printer resource store), and determines which resources to retain or release. The resource loader 214 looks at the explicit dependencies for both current RPLs and future RPLs. Note that the resource loader 214 is only interested in the order in which resources should be loaded and released; it is not concerned with the actual timing of resource changes. The timing of changes to the printer resource store 220 is controlled by the resource scheduler 216.

As stated above, the explicitly stated dependencies makes it easier for the resource loader 214 to determine the sequence of loading resources into the printer resource store 220. The more difficult task is to determine when to release resources from the printer resource store 220 to make room for new resources. It is obvious that a resource that will never be used again can be deleted without concern. However, if the resources will be used again in the future, the resource loader 214 must decide which resources to release to make room for new resources. In many caching systems of the prior art, the general approach is to delete the item that was least recently used (i.e., delete the resource the was used the longest time ago). This approach is not effective for predicting which resources are least needed in the future. Because of the explicit dependencies, the computer-printer system 200 can perform clairvoyant caching of resources to predict the most efficient storage of resources for future data blocks of the document. The resources are managed based on the order in which the resources are used, the amount of space required to store a resource, and the time required to reload a resource if it must be released from the printer resource store 220. The resource loader 214 uses the explicit dependencies to establish a "time line" in which the resource loader looks at the resources currently in the printer resource store 220 and determines which resource will be used farthest out in time. However, as stated above, the resource loader 214 also considers the size of the resource to be deleted and the time required to reload the resource in the future.

As an example of clairvoyant caching assume that the printer resource store 220 already contains ten resources (generically labeled 1 through 10 for this example), and the printer 218 requires resource number 11 for a particular data block. The resource loader 214 will look at the time line and may determine that resource number 8, for example, will be used farthest out in time. However, if resource number 8 is small in size, its release may still leave the printer resource store 220 without sufficient space to load the required resource number 11. Therefore, the resource loader 214 will look again at the time line to determine the next resource after number 8 that will be used farthest out in time. Resource number 2, for example, could be released. However, if the release of resource number 2 creates more free space in the printer resource store 220 than is necessary, and the reloading of resource number 2 in the future will be very time consuming, the resource loader 214 may look again at the time line to release one or more other resources instead. In this example, the resource loader 214 may release resource numbers 7 and 5, instead of resource numbers 2 and 8, in order to make room in the printer resource store 220 for the required resource number 11. This description simply serves as an example of the various parameters that the resource loader 214 considers in managing the printer resource store 220.

While the resource loader 214 determines the order in which resources are loaded into and released from the printer resource store 220, the actual timing of the resource management is performed by the resource scheduler 216. The resource scheduler 216 may be thought of as the printer operating system. However, as discussed above, the resource scheduler 216 need not be physically located within the printer 218. In a computer-printer system 200 with only one-way communication, the resource scheduler 216 may be located within the host computer 202 and manage the printer memory 222 from the host computer. If the computer-printer system 200 has bidirectional communication, the resource scheduler 216 resides in the printer 218 allowing the printer to manage it own printer memory 222. Because the host computer 202, the printer 218, and the print engine 226 within the printer all operate asynchronously, the resource scheduler 216 must control all timing so that there are no conflicts between the three asynchronous parts. The resource scheduler 216 initiates and controls all printer timing, synchronizes operation with the print engine 226 and decides when a particular resource will be accepted into the printer resource store 220.

The resource scheduler 216 also decides when to delete a particular resource from the printer resource store 220. As previously described, it is the task of the resource loader 214 to specify the sequence of loading and releasing resources. The resource scheduler 216 determines when the printer 218 has no further need for a particular resource which has previously been released by the resource loader 214. Like the resource loader 214, the resource scheduler 216 also has access to the explicit dependencies created by the resource assembler 208. Unlike the resource loader 214, the resource scheduler 216 is only interested in whether the necessary resources for the current page are present in the printer resource store 220.

When all dependencies for the current page are met (i.e., all required resources are present in the printer resource store 220), the resource scheduler 216 generates an execute signal that commits the print engine 226 to printing the page. As will be explained in greater detail below, the print engine must be provided with bit-map data in real-time once the commitment has been made to print a page or the page will not be properly printed because the print engine cannot stop in the middle of the page. It should be noted that a duplexing printer requires an execute signal for each side of the page (i.e., the printing process can stop between sides of the paper). The resource scheduler 216 determines when a real-time commitment can be made to the print engine and generates the execute signal to commit the print engine to printing a page.

The resource scheduler 216 performs similar functions in both one-way and bidirectional communications. In a one-way communication system, the resource scheduler 216 generates a BUSY flag in the hardware interface which indicates printer status to the host computer 202. The resource scheduler also decides when in time a resource will actually be deleted from the printer resource store 218. In a bidirectional communication system, the resource loader 214 manages the printer memory 222 from the printer 218 and makes specific requests to the host computer 202 for particular resources. In addition, the resource scheduler 216 monitors the printing process and informs the host computer 202 when a page has cleared the last paper jam sensor within the print engine 226. Thus, the host computer 202 knows that it no longer needs to retain resources associated with that page to provide error recovery. The resource scheduler 216 may also plan the paper path for a printing task. This is especially important in large printers which have multiple paper bins, multiple paper sizes and paths. Planning the optimal paper path improves the overall efficiency of the printing task.

The resource executor 224 accepts the execute signal from the resource scheduler 216 and converts the RPLs to a bit-map that can be used by the print engine 226 to actually print the page. Other resources may already be present within the printer resource store 220 in bit-map form. The resource executor 224 utilizes the resources, which are currently available in the printer resource store 220, to generate the bit-map. As previously discussed, some printers operate in a banding mode. The computer-printer system 200 of the present invention works with printers operating in a banding mode or a page mode. The resource executor 224 is constrained to real-time operation if a banding mode is used. That is, once a real-time commitment has been made to the print engine 226, the resource executor must convert all RPLs to a bit-map, one band at a time, in real-time or an error will occur. If the printer 218 is operating in the page mode (as opposed to the banding mode), there is no real-time commitment. The resource executor 224 can convert the entire page to a bit-map before transferring the bit-map to the print engine. The computer-printer system 200 of the present invention can operate in either the page mode or the banding mode. The actual conversion of an RPL into a bit-map data file is well known to those of ordinary skill in the art and is not discussed herein.

The print engine 226 accepts the bit-map data from the resource executor 224 and causes the bit-map data to be printed on the page. Use of the print engine 226 is also well known to those skilled in the art and is not discussed herein.

As the bit-map data for one page of the document is processed by the print engine 226, the paper moves through the printer 218. There are a number of sensors throughout the print engine 226 to detect errors such as a paper jam or a low toner condition. Prior art systems retain the bit-map data in printer memory until the page clears the last paper jam sensor. If a paper jam error occurs, the prior art systems have the data already in bit-map form to reprint the page which jammed. If the computer-printer system 200 has bidirectional communication capability, however, the bit-map data is not maintained within the printer 218, but generates error recovery data within the host computer 202. Prior art systems may appear to have faster error recovery than the present invention because the bit-map data is already in the printer memory waiting to be reprinted if a page should jam. However, page jam errors occur so seldom in the normal printing process that it is more efficient for the overall printing process to continue processing data for future pages and not worry about the most efficient technique for error recovery. Rather, the computer-printer system 200 of the present invention is concerned with the most efficient technique for printing the entire document.

Prior art systems cannot promptly process data for the next page because the printer memory is forced to retain the bit-map data until the page has cleared the last paper jam sensor. It takes a typical print engine approximately ten seconds to take a sheet of paper, produce an image on the paper, and drop the paper in a paper tray. The present invention continues to process data for future pages in a document with the expectation that the paper will not jam. During the period of time that the prior art systems are waiting for the printed page to clear the last paper jam sensor, the computer-printer system 200 can assemble resources, translate the PDL into RPLs and manage the flow of resources in the printer resource store 220 for several pages.

In the unlikely event of a paper jam, the host computer 202 reprocesses the page from the beginning. There is no real cost in time since the operator must intervene to physically remove the jammed page or pages if a paper jam does occur. While the operator is removing the jammed pages, the resource loader 214 determines which pages need error recovery and begins to reload the required resources and RPLs into the printer 218. The explicit dependencies simplify the error recovery process because the resource loader 214 looks at the explicit dependency list to determine which resource are needed for the error recovery process. For example, the printer 218 may have jammed the sheets of paper numbered pages two through five, with pages two and three being duplex and four and five simplex. If the printer 218 had previously specified the printing order to be page three (from bottom to top), page two (from top to bottom), page four (top to bottom) and page five (top to bottom), the resource loader 214 will use the explicit dependencies to request resources and RPLs in the most efficient manner to perform the error recovery. These activities may take place while the operator is removing the jammed paper. Thus, the computer-printer system 200 does not lose time in error recovery when compared to systems of the prior art. Furthermore, the efficiency of the printing process is greatly enhanced by assuming that the pages will not normally jam. Thus, the computer-printer system 200 can process a document in a much shorter time than any prior art systems.

As previously stated, the computer-printer system 200 of the present invention can operate with one-way communication from the host computer 202 to the printer 218, or can function with a complete bidirectional communication channel between the host computer 202 and the printer 218. If the hardware of the host computer 202 or of the printer 218 cannot support bidirectional communication, then only one way communication is possible. Even with the limits of one-way communication, the computer-printer system 200 of the present invention is still an improvement over the prior art. In some cases, bidirectional communication may be supported by both the computer system 202 and the printer 218, but the latency time of the bidirectional communication channel is so long that it is impossible to efficiently support full bidirectional communication. In that event, the computer-printer system 200 of the present invention can support limited bidirectional communication between the printer 218 and the host computer 202. This mode, while still not as efficient as full bidirectional communication, is favored over one-way communication. Limited bidirectional communication gives the host computer better error and status reporting than simple one-way communication. The data processing may proceed as if there is only one-way communication, but if an error occurs, the computer-printer system 200 may utilize the error and status information to recover from the error.

Some laser printer systems that use PCL language have provisions for a software cartridge to plug into the printer. The cartridge may contain additional fonts. The computer-printer system 200 may use such a cartridge to provide the printer 218 with the necessary components of the invention that reside within the printer. In one embodiment of the invention, the computer-printer system 200 has the ability to operate in a first mode using the PCL, or it may operate in a second mode using the present invention. In this embodiment, the computer-printer system 200 may automatically switch back and forth between the two modes. This allows the computer-printer system 200 to remain compatible with other applications, such as DOS applications. By switching back and forth between the two modes, the computer-printer system 200 gives greater compatibility with prior art systems.

Those skilled in the art will appreciate that the revolutionary approach to printing used by the present invention greatly increases the overall speed of the printing process. By discarding the existing notions of how the printing process should be approached and taking advantage of all available computing power in both the host computer and the printer, the present invention has dramatically increased the printing speed with little additional cost in hardware. The principles of the present invention may be readily applied to existing laser printers.

It is to be understood that even though various embodiments and advantages of the present invention have been set forth in the foregoing description, the above disclosure is illustrative only, and changes may be made in detail and yet remain within the broad principles of the present invention. Therefore, the present invention is to be limited only by the appended claims.

What is claimed is:

1. A computer-printer system including a printer and a host computer for controlling and printing a document on the printer, the host computer having a resource storage area for storing resources, a plurality of resources stored in the resource storage area, and a data file for the document containing data describing a plurality of objects to be printed, the printer containing a print engine, the system comprising:

a host resource store within the host computer storing a selected set of resources comprising a plurality of the resources required to print the document;

a resource assembler within the host computer examining the data file and selecting some of the resources from the resource storage area to form said selected set of resources required for printing the document, loading said selected set of resources in said host resource store, translating the data file into a set of primitives corresponding to the plurality of objects within a particular portion of the document, determining a subset of said selected resources which are required from said host resource store for printing said particular portion of the document, and defining the interdependency of said set of primitives with said subset of required resources;

a printer resource store within the printer for storing said subset of required resources and said set of primitives received from the host computer;

a resource loader within the host computer using said defined interdependency to determine a loading and releasing sequence in which said subset of required resources and said set of primitives will be sent to said printer resource store and released from said printer resource store;

a resource scheduler within the printer controlling transfer of said subset of required resources and said set of primitives to said printer resource store; and a resource executor within the printer creating a bit-map data file corresponding to said subset of required resources and said set of primitives and transferring said bit-map data file to the print engine for printing.

2. The system of claim I wherein said resource loader determines said loading and releasing sequence based on the mount of space available in said printer resource store and when said subset of resources is required to print a future portion of the document.

3. The system of claim 1 wherein said resource loader determines said loading and releasing sequence based on the time required to again transfer said subset of required resources to said printer resource store.

4. The system of claim 1 wherein said resource loader determines said loading and releasing sequence based on the size of said subset of required resources to be transferred to said printer resource store.

5. The system of claim 1 wherein said resource assembler determines if said resource executor can convert said set of primitives to said bit-map data file in real-time while the print engine is printing, and if said resource executor cannot, said resource assembler converting said set of primitives into said bit-map data file.

6. The system of claim 1, further including decision means within said resource assembler for determining whether said resource executor or said resource assembler will convert said set of primitives to said bit-map data file.

7. The system of claim 6 wherein said decision means bases the determination on the length of time required for said resource executor to convert said set of primitives to said bit-map data file and the length of time required for said resource assembler to convert said set of primitives to said bit-map data file.

8. The system of claim 1 wherein said resource assembler translates the data file into a plurality of sets of primitives corresponding to the plurality of objects within a plurality of particular portions of the document, and determines a plurality of subsets of said selected resources which are required from said host resource store for printing said plurality of particular portions of the document, said defined interdependency defining the interdependency of said plurality of sets of primitives with said plurality of subsets of required resources.

9. The system of claim 8 wherein said resource loader determines said loading and releasing sequence in which said plurality of subsets of required resources and said plurality of sets of primitives will be sent to and released from said printer resource store.

10. The system of claim 1 wherein said set of primitives is transferred from the host computer to the printer in an uncompressed binary data format.

11. The system of claim 1 wherein said resource scheduler generates an execute signal when all of said subset of required resources and said set of primitives for said particular portion of the document are present within said printer resource store and said resource executor, upon receiving said execute signal, creates a bit-map data file corresponding to said set of primitives and transfers said bit-map data file to the print engine for printing.

12. The system of claim 1 wherein said defined interdependency is defined by a dependency list.

13. The system of claim 12 wherein said resource assembler maintains said dependency list even after the print engine has started printing said particular portion of the document, said resource assembler using said dependency list in the event of a printer error.

14. The system of claim 1 wherein said resource assembler stores said set of primitives in said host resource store.

15. The system of claim 1 wherein said particular portion is chosen to be a band corresponding in size to a printer band if the printer is operating in a banding mode.

16. The system of claim 1 wherein said resource scheduler, in response to said releasing sequence, deletes said subset of required resources and said set of primitives from said printer resource store.

17. A computer-printer system employing a printer and a host computer for controlling and printing a document on the printer, the host computer having a resource storage area for storing resources, a plurality of resources stored in the resource storage area, and a data file for the document containing data describing a plurality of objects to be printed, the printer containing a print engine, the system comprising:

a resource assembler examining the data file and selecting some of the resources from the resource storage area to form a selected set of resources required for printing the document, and translating the data file into a set of primitives corresponding to the plurality of objects within the document;

a resource store for storing said subset of required resources and said set of primitives;

a resource scheduler within the printer controlling transfer of said required resources and said set of primitives to said resource store; and a resource executor within the printer creating a bit-map data file corresponding to said required resources and said set of primitives and transferring said bit-map data file to the print engine for printing.

18. A computer-printer system including a printer and a host computer for controlling and printing a document on the printer, the host computer having a resource storage area for storing resources, a plurality of resources stored in the resource storage area, and a data file for the document containing data describing a plurality of objects to be printed, the printer containing a print engine, the system comprising:

a first resource store storing a selected set of resources comprising a plurality of the resources required to print the document;

a resource assembler examining the data file and selecting some of the resources from the resource storage area to form said selected set of resources required for printing the document, loading said selected set of resources in said first resource store, translating the data file into a set of primitives corresponding to the plurality of objects within a particular portion of the document, determining a subset of said selected resources which are required from said first resource store for printing said particular portion of the document, and defining the interdependency of said set of primitives with said subset of required resources;

a second resource store for storing said subset of required resources and said set of primitives received from the host computer;

a resource loader using said defined interdependency to determine a loading and releasing sequence in which said subset of required resources and said set of primitives will be sent to said second resource store and released from said second resource store;

a resource scheduler controlling transfer of said subset of required resources and said set of primitives to said second resource store; and a resource executor creating a bit-map data file corresponding to said subset of required resources and said set of primitives and transferring said bit-map data file to the print engine for printing.

19. The system of claim 18 wherein said resource loader determines said loading and releasing sequence based on the mount of space available in said second resource store and when said subset of resources is required to print a future portion of the document.

20. The system of claim 18 wherein said resource loader determines said loading and releasing sequence based on the time required to again transfer said subset of required resources to said second resource store.

21. The system of claim 18 wherein said resource loader determines said loading and releasing sequence based on the size of said subset of required resources to be transferred to said second resource store.

22. The system of claim 18 wherein said resource assembler determines if said resource executor can convert said set of primitives to said bit-map data file in real-time while the print engine is printing, and if said resource executor cannot, said resource assembler converting said set of primitives into said bit-map data file.

23. The system of claim 18, further including decision means within said resource assembler for determining whether said resource executor or said resource assembler will convert said set of primitives to said bit-map data file.

24. The system of claim 23 wherein said decision means bases the determination on the length of time required for said resource executor to convert said set of primitives to said bit-map data file and the length of time required for said resource assembler to convert said set of primitives to said bit-map data file.

25. The system of claim 18 wherein said resource assembler translates the data file into a plurality of sets of primitives corresponding to the plurality of objects within a plurality of particular portions of the document, and determines a plurality of subsets of said selected resources which are required from said first resource store for printing said plurality of particular portions of the document, said defined interdependency defining the interdependency of said plurality of sets of primitives with said plurality of subsets of required resources.

26. The system of claim 25 wherein said resource loader determines said loading and releasing sequence in which said plurality of subsets of required resources and said plurality of sets of primitives will be sent to and released from said second resource store.

27. The system of claim 18 wherein said set of primitives is transferred from the host computer to the printer in an uncompressed binary data format.

28. The system of claim 18 wherein said resource scheduler generates an execute signal when all of said subset of required resources and said set of primitives for said particular portion of the document are present within said second resource store and said resource executor, upon receiving said execute signal, creates a bit-map data file corresponding to said set of primitives and transfers said bit-map data file to the print engine for printing.

29. The system of claim 18, further including means for operating in a first mode compatible with prior art computer-printer systems, or a second mode compatible with the present invention.

30. The system of claim 18 wherein said defined interdependency is defined by a dependency list, said resource assembler maintaining said dependency list even after the print engine has started printing said particular portion of the document, said resource assembler using said dependency list in the event of a printer error.

31. The system of claim 18 wherein said resource assembler stores said set of primitives in said first resource store.

32. The system of claim 18 wherein said particular portion is chosen to be a band corresponding in size to a printer band if the printer is operating in a banding mode.

33. The system of claim 18 wherein said resource scheduler, in response to said releasing sequence, deletes said subset of required resources and said set of primitives from said second resource store.

34. A system employing a host computer for controlling and printing a document on a printer, the host computer having a resource storage area for storing resources, a plurality of resources stored in the resource storage area, and a data file for the document containing data describing a plurality of objects to be printed, the printer containing a resource executor generating a bit-map data file corresponding to the data to be printed, and a print engine to control the page printing, the system comprising:

a resource assembler examining the data file and translating the data file into a set of primitives corresponding to the plurality of objects within a particular portion of the document, and determining a subset of said selected resources which are required from said host resource store for printing said particular portion of the document;

a resource loader to determine a loading and releasing sequence in which said subset of required resources and said set of primitives will be sent to the printer and released from the printer; and a resource scheduler controlling transfer of said subset of required resources and said set of primitives to the printer.

35. The system of claim 34, further including a resource store capable of storing a limited number of resources receiving said subset of required resources and said set of primitives.

36. The system of claim 35 wherein said resource loader determines said loading and releasing sequence based on the amount of space available in said resource store and when said subset of resources is required to print a future portion of the document.

37. The system of claim 35 wherein said resource loader determines said loading and releasing sequence based on the time required to again transfer said subset of required resources to said resource store.

38. The system of claim 35 wherein said resource loader determines said loading and releasing sequence based on the size of said subset of required resources to be transferred to said resource store.

39. The system of claim 34 wherein said resource assembler determines if the resource executor can convert said set of primitives to the bit-map data file in real-time while the print engine is printing, and if the resource executor cannot, then said resource assembler converting said set of primitives into the bit-map data file.

40. The system of claim 34, further including decision means within said resource assembler for determining whether the resource executor or said resource assembler will convert the set of primitives to said bit-map data file.

41. The system of claim 40 wherein said decision means bases the determination on the length of time required for the resource executor to convert said set of primitives to said bit-map data file and the length of time required for said resource assembler to convert said set of primitives to the bit-map data file.

42. The system of claim 34 wherein said resource assembler translates the data file into a plurality of sets of primitives corresponding to the plurality of objects within a plurality of particular portions of the document, and determines a plurality of subsets of said selected resources which are required from said first resource store for printing said plurality of particular portions of the document, and generating a defined interdependency defining the interdependency of said plurality of sets of primitives with said plurality of subsets of required resources.

43. The system of claim 42 wherein said resource loader uses said defined interdependency to determine said loading and releasing sequence in which said plurality of subsets of required resources and said plurality of sets of primitives will be sent to and released from said second resource store.

44. A printer system, employing a print engine, for printing a document from a host computer, the host computer having a resource storage area for storing resources, a plurality of resources stored in the resource storage area, a data file for the document containing data describing a plurality of objects to be printed, a resource assembler examining the data file and translating the data file into a set of primitives corresponding to the plurality of objects within a particular portion of the document, determining a subset of the resources which are required for printing the particular portion of the document, and defining the interdependency of the set of primitives with the subset of required resources, the host computer also having a resource loader using the defined interdependency to determine a loading and releasing sequence in which the subset of required resources will be sent to the printer and released from the printer, the system comprising:

a printer resource store for storing the subset of required resources received from the host computer;

a resource scheduler controlling transfer of said subset of required resources and said set of primitives from the host computer and using the defined interdependency to determine when the subset of required resources and the set of primitives are present within said printer resource store, said resource scheduler generating an execute signal when all of the subset of required resources and the set of primitives are present within said printer resource store; and a resource executor receiving the subset of required resources and the set of primitives from said printer resource store and, upon receiving said execute signal, creating a bit-map data file corresponding to the subset of required resources and the set of primitives and transferring said bit-map data file to the print engine for printing.

45. A computer-printer system including a printer and a host computer for controlling and printing a document on the printer, the host computer having a resource storage area for storing resources, a plurality of resources stored in the resource storage area, and a data file for the document containing data describing a plurality of objects to be printed, the printer containing a print engine, the system comprising:

a host resource store within the host computer storing a selected set of resources comprising a plurality of the resources required to print the document;

a resource assembler within the host computer examining the data file and selecting some of the resources from the resource storage area to form said selected set of resources required for printing the document, loading said selected set of resources in said host resource store, translating the data file into a set of primitives corresponding to the plurality of objects within a particular portion of the document, determining a subset of said selected resources which are required from said host resource store for printing said particular portion of the document, defining the interdependency of said set of primitives with said subset of required resources, and transmitting said defined interdependency to the printer;

a printer resource store within the printer for storing said subset of required resources and said set of primitives received from the host computer;

a resource loader within the printer using said defined interdependency to determine a loading and releasing sequence in which said subset of required resources and said set of primitives will be sent to said printer resource store and released from said printer resource store;

a resource scheduler within the printer controlling transfer of said subset of required resources and said set of primitives to said printer resource store; and a resource executor within the printer creating a bit-map data file corresponding to said subset of required resources and said set of primitives and transferring said bit-map data file to the print engine for printing.

46. The system of claim 45 wherein said resource scheduler determines the status of said printer resource store indicating which, if any, resources are already present in said printer resource store, said resource loader also using said status information to determine said loading and releasing sequence.

47. The system of claim 46 wherein said resource scheduler transmits said status information to said resource assembler, said resource assembler using said status information to determine which additional resources are required for printing the document.

48. The system of claim 45 wherein said resource scheduler determines sequence information in which a plurality of particular portions of the document are to be printed by the printer, said resource loader also using said sequence information to determine said loading and releasing sequence.

49. The system of claim 48 wherein said resource scheduler transmits said sequence information to said resource assembler, said resource assembler using said sequence information to determine the order in which particular portions of the document will be processed by said resource assembler.

50. The system of claim 45 wherein said resource loader determines said loading and releasing sequence based on the amount of space available in said printer resource store and when said subset of resources is required to print a future portion of the document.

51. The system of claim 45 wherein said resource loader determines said loading and releasing sequence based on the time required to again transfer said subset of required resources to said printer resource store.

52. The system of claim 45 wherein said resource loader determines said loading and releasing sequence based on the size of said subset of required resources to be transferred to said printer resource store.

53. The system of claim 45 wherein said resource assembler determines if said resource executor can convert said set of primitives to said bit-map data file in real-time while the print engine is printing, and if said resource executor cannot, said resource assembler converting said set of primitives into said bit-map data file.

54. The system of claim 45, further including decision means within said resource assembler for determining whether said resource executor or said resource assembler will convert said set of primitives to said bit-map data file.

55. The system of claim 54 wherein said decision means bases the determination on the length of time required for said resource executor to convert said set of primitives to said bit-map data file and the length of time required for said resource assembler to convert said set of primitives to said bit-map data file.

56. The system of claim 45 wherein said resource assembler translates the data file into a plurality of sets of primitives corresponding to the plurality of objects within a plurality of particular portions of the document, and determines a plurality of subsets of said selected resources which are required from said host resource store for printing said plurality of particular portions of the document, said defined interdependency defining the interdependency of said plurality of sets of primitives with said plurality of subsets of required resources.

57. The system of claim 56 wherein said resource loader determines said loading and releasing sequence in which said plurality of subsets of required resources and said plurality of sets of primitives will be sent to and released from said printer resource store.

58. The system of claim 45 wherein said set of primitives is transferred from the host computer to the printer in an uncompressed binary data format.

59. The system of claim 45 wherein said resource scheduler generates an execute signal when all of said subset of required resources and said set of primitives for said particular portion of the document are present within said printer resource store and said resource executor, upon receiving said execute signal, creates a bit-map data file corresponding to said set of primitives and transfers said bit-map data file to the print engine for printing.

60. The system of claim 45, further including means for operating in a first mode compatible with prior art computer-printer systems, or a second mode compatible with the present invention.

61. The system of claim 60 wherein said defined interdependency is defined by a dependency list, said resource assembler maintaining said dependency list even after the print engine has started printing said particular portion of the document, said resource assembler using said dependency list in the event Of a printer error.

62. The system of claim 45 wherein said resource assembler stores said set of primitives in said host resource store.

63. The system of claim 45 wherein said particular portion is chosen to be a band corresponding in size to a printer band if the printer is operating in a banding mode.

64. The system of claim 45 wherein said resource scheduler, in response to said releasing sequence, deletes said subset of required resources and said set of primitives from said printer resource store.

65. The system of claim 45 wherein said resource loader may be alternately located within the host computer or the printer.

66. The system of claim 65, further including means within the host computer for determining the location of said resource loader.

67. The system of claim 64 wherein said means for determining location includes analysis of communications channel capability between the host computer and the printer.

68. The system of claim 45, further including error sensors within the printer generating an error signal if an error occurs while printing said particular portion, the host computer including means for error recovery if the printer generates said error signal.

69. The system of claim 68 wherein said resource scheduler uses said defined interdepency to request said subset of required resources and said set of primitives from said host resource store for said particular portion of the document in which said error signal was generated.

70. A computer-printer system including a printer and a host computer for controlling and printing a document on the printer, the host computer having a resource storage area for storing resources, a plurality of resources stored in the resource storage area, and a data file for the document containing data describing a plurality of objects to be printed, the printer containing a print engine, the system comprising:

a first resource store storing a selected set of resources comprising a plurality of the resources required to print the document;

a resource assembler examining the data file and selecting some of the resources from the resource storage area to form said selected set of resources required for printing the document, loading said selected set of resources in said first resource store, translating the data file into a set of primitives corresponding to the plurality of objects within a particular portion of the document, determining a subset of said selected resources which are required from said first resource store for printing said particular portion of the document, defining the interdependency of said set of primitives with said subset of required resources, and transmitting said defined interdependency to the printer;

a second resource store for storing said subset of required resources and said set of primitives;

a resource loader using said defined interdependency to determine a loading and releasing sequence in which said subset of required resources and said set of primitives will be sent to said second resource store and released from said second resource store;

a resource scheduler controlling transfer of said subset of required resources and said set of primitives to said second resource store; and a resource executor creating a bit-map data file corresponding to said subset of required resources and said set of primitives and transferring said bit-map data file to the print engine for printing.

71. The system of claim 70 wherein said resource scheduler determines the status of said second resource store indicating which, if any, resources are already present in said second resource store, said resource loader also using said status information to determine said loading and releasing sequence.

72. The system of claim 71 wherein said resource scheduler transmits said status information to said resource assembler, said resource assembler using said status information to determine which additional resources are required for printing the document.

73. The system of claim 72 wherein said resource scheduler determines sequence information in which a plurality of particular portions of the document are to be printed by the printer, said resource loader also using said sequence information to determine said loading and releasing sequence.

74. The system of claim 73 wherein said resource scheduler transmits said sequence information to said resource assembler, said resource assembler using said sequence information to determine the order in which particular portions of the document will be processed by said resource assembler.

75. The system of claim 70 wherein said resource loader determines said loading and releasing sequence based on the amount of space available in said second resource store and when said subset of resources is required to print a future portion of the document.

76. The system of claim 70 wherein said resource loader determines said loading and releasing sequence based on the time required to again transfer said subset of required resources to said second resource store.

77. The system of claim 70 wherein said resource loader determines said loading and releasing sequence based on the size of said subset of required resources to be transferred to said second resource store.

78. The system of claim 70 wherein said resource assembler determines if said resource executor can convert said set of primitives to said bit-map data file in real-time while the print engine is printing, and if said resource executor cannot, said resource assembler converting said set of primitives into said bit-map data file.

79. The system of claim 70, further including decision means within said resource assembler for determining whether said resource executor or said resource assembler will convert said set of primitives to said bit-map data file.

80. The system of claim 79 wherein said decision means bases the determination on the length of time required for said resource executor to convert said set of primitives to said bit-map data file and the length of time required for said resource assembler to convert said set of primitives to said bit-map data file.

81. The system of claim 70 wherein said resource assembler translates the data file into a plurality of sets of primitives corresponding to the plurality of objects within a plurality of particular portions of the document, and determines a plurality of subsets of said selected resources which are required from said first resource store for printing said plurality of particular portions of the document, said defined interdependency defining the interdependency of said plurality of sets of primitives with said plurality of subsets of required resources.

82. The system of claim 81 wherein said resource loader determines said loading and releasing sequence in which said plurality of subsets of required resources and said plurality of sets of primitives will be sent to and released from said second resource store.

83. The system of claim 70 wherein said set of primitives is transferred from the host computer to the printer in an uncompressed binary data format.

84. The system of claim 70 wherein said resource scheduler generates an execute signal when all of said subset of required resources and said set of primitives for said particular portion of the document are present within said second resource store and said resource executor, upon receiving said execute signal, creates a bit-map data file corresponding to said set of primitives and transfers said bit-map data file to the print engine for printing.

85. The system of claim 70 wherein said defined interdependency is defined by a dependency list.

86. The system of claim 85 wherein said resource assembler maintains said dependency list even after the print engine has started printing said particular portion of the document, said resource assembler using said dependency list in the event of a printer error.

87. The system of claim 70 wherein said resource assembler stores said set of primitives in said first resource store.

88. The system of claim 70 wherein said particular portion is chosen to be a band corresponding in size to a printer band if the printer is operating in a banding mode.

89. The system of claim 70 wherein said resource scheduler, in response to said releasing sequence, deletes said subset of required resources and said set of primitives from said second resource store.

90. The system of claim 70 wherein said resource loader may be alternately located within the host computer or the printer.

91. The system of claim 90, further including means within the host computer for determining the location of said resource loader.

92. The system of claim 91 wherein said means for determining location includes analysis of communications channel capability between the host computer and the printer.

93. The system of claim 70, further including error sensors within the printer generating an error signal if an error occurs while printing said particular portion, the host computer including means for error recovery if the printer generates said error signal.

94. The system of claim 93 wherein said resource scheduler uses said defined interdependency to request said subset of required resources and said set of primitives from said first resource store for said particular portion of the document in which said error signal was generated.

95. A host computer for controlling and printing a document on a printer, the host computer having a resource storage area for storing resources, a plurality of resources stored in the resource storage area, and a data file for the document containing data describing a plurality of objects to be printed, the printer having a resource loader to determine a loading and releasing sequence in which data will be sent to the printer and released from the printer, a resource scheduler controlling transfer of data to the printer, a resource executor generating a bit-map data file corresponding to the data to be printed, a print engine to control the page printing and error sensors generating an error signal if an error occurs while printing, the system comprising:

a first resource store storing a selected set of resources comprising a plurality of the resources required to print the document; and a resource assembler examining the data file and selecting some of the resources from the resource storage area to form said selected set of resources required for printing the document, loading said selected set of resources in said first resource store, translating the data file into a set of primitives corresponding to the plurality of objects within a particular portion of the document, determining a subset of said selected resources which are required from said first resource store for printing said particular portion of the document, defining the interdependency of said set of primitives with said subset of required resources, and transmitting said defined interdependency to the printer.

96. The system of claim 95 wherein the resource scheduler determines a sequence information in which a plurality of particular portions of the document are to be printed by the printer and transmits said sequence information to said resource assembler, said resource assembler using said sequence information to determine the order in which particular portions of the document will be processed by said resource assembler.

97. The system of claim 95, further including a second resource store capable of storing a limited number of resources receiving said subset of required resources and said set of primitives.

98. The system of claim 95 wherein said resource assembler determines if the resource executor can convert said set of primitives to said bit-map data file in real-time while the print engine is printing, and if the resource executor cannot, said resource assembler converting said set of primitives into said bit-map data file.

99. The system of claim 95, further including decision means within said resource assembler for determining whether the resource executor or said resource assembler will convert said set of primitives to said bit-map data file.

100. The system of claim 99 wherein said decision means bases the determination on the length of time required for the resource executor to convert said set of primitives to said bit-map data file and the length of time required for said resource assembler to convert said set of primitives to said bit-map data file.

101. The system of claim 95 wherein said resource assembler translates the data file into a plurality of sets of primitives corresponding to the plurality of objects within said plurality of particular portions of the document, and determines a plurality of subsets of said selected resources which are required from said first resource store for printing said plurality of particular portions of the document, said defined interdependency defining the interdependency of said plurality of sets of primitives with said plurality of subsets of required resources.

102. The system of claim 95 wherein the resource loader may be alternately located within the host computer or the printer.

103. The system of claim 102, further including means within the host computer for determining the location of the resource loader.

104. The system of claim 103 wherein said means for determining location includes analysis of communications channel capability between the host computer and the printer.

105. The system of claim 95, further including means within the host computer for error recovery if the printer generates an error signal.

106. The system of claim 105 wherein the resource scheduler uses said defined interdependency to request said subset of required resources and said set of primitives from said host resource store for said particular portion of the document in which an error signal was generated.

107. A printer system, containing a print engine, for printing a document from a host computer, the host computer having a resource storage area for storing resources, a plurality of resources stored in the resource storage area, a data file for the document containing data describing a plurality of objects to be printed on the page, a host resource store storing a selected set of resources comprising a plurality of the resources required to print the document, a resource assembler examining the data file and selecting some of the resources from the resource storage area to form the selected set of resources required for printing the document, the resource assembler loading the selected set of resources in the host resource store, translating the data file into a set of primitives corresponding to the plurality of objects within a particular portion of the document, determining a subset of said selected resources which are required from the host resource store for printing the particular portion of the document, defining the interdependency of the set of primitives with the subset of required resources, and transmitting the defined interdependency to the printer, the system comprising:

- a printer resource store for storing the subset of required resources received from the host computer;
- a resource loader using the defined interdependency to determine a loading and releasing sequence in which the subset of required resources and the set of primitives will be sent to said printer resource store and released from said printer resource store;
- a resource scheduler within the printer controlling transfer of the subset of required resources and the set of primitives to said printer resource store; and
- a resource executor receiving the subset of required resources and the set of primitives from said printer resource store and creating a bit-map data file corresponding to the subset of required resources and the set of primitives and transferring said bit-map data file to the print engine for printing.

108. The system of claim 107 wherein said resource scheduler determines the status of said printer resource store indicating which, if any, resources are already present in said printer resource store, said resource loader also using said status information to determine said loading and releasing sequence.

109. The system of claim 107 wherein said resource scheduler determines sequence information in which a plurality of particular portions of the document are to be printed by the printer, said resource loader also using said sequence information to determine said loading and releasing sequence.

110. The system of claim 109 wherein said resource scheduler transmits said sequence information to the resource assembler, the resource assembler using said sequence information to determine the order in which particular portions of the document will be processed.

111. The system of claim 107 wherein said resource loader determines said loading and releasing sequence based on the amount of space available in said printer resource store and when said subset of resources is required to print a future portion of the document.

112. The system of claim 107 wherein said resource loader determines said loading and releasing sequence based on the time required to again transfer said subset of required resources to said printer resource store.

113. The system of claim 107 wherein said resource loader determines said loading and releasing sequence based on the size of said subset of required resources to be transferred to said printer resource store.

114. The system of claim 107 wherein said resource scheduler generates an execute signal when all of the subset of required resources and the set of primitives for the particular portion of the document are present within said printer resource store and said resource executor, upon receiving said execute signal, creates a bit-map data file corresponding to the set of primitives and transfers said bit-map data file to the print engine for printing.

115. The system of claim 107 wherein the particular portion is chosen to be a band corresponding in size to a printer band if the printer is operating in a banding mode.

116. The system of claim 107 wherein said resource scheduler, in response to said releasing sequence, deletes said subset of required resources said set of primitives from said printer resource store.

117. The system of claim 107 wherein said resource loader may be alternately located within the host computer or the printer.

118. The system of claim 117, further including means within the host computer for determining the location of said resource loader.

119. The system of claim 118 wherein said means for determining location includes analysis of communications channel capability between the host computer and the printer.

120. A method of using a computer-printer system including a printer and a host computer for controlling and printing a document on the printer, the host computer having a resource storage area for storing resources, a plurality of resources stored in the resource storage area, and a data file for the document containing data describing a plurality of objects to be printed, the printer containing a print engine, the method comprising the steps of:

(a) examining the data file and selecting some of the resources from the resource storage area to form a selected set of resources required for printing the document;

(b) loading said selected set of resources in a first resource store;

(c) translating the data file into a set of primitives corresponding to the plurality of objects within a particular portion of the document;

(d) determining a subset of said selected resources which are required from said first resource store for printing said particular portion of the document;

(e) defining the interdependency of said set of primitives with said subset of required resources;

(f) using said defined interdependency to determine a loading and releasing sequence in which said subset of required resources and said set of primitives will be sent to a second resource store and released from said second resource store;

(g) transferring said subset of required resources and said set of primitives to said second resource store; and (h) creating a bit-map data file corresponding to said subset of required resources and said set of primitives and transferring said bit-map data file to the print engine for printing.

121. The method of claim 120 wherein the determination of said loading and releasing sequence is based on the amount of space available in said second resource store and when said subset of resources is required to print a future portion of the document.

122. The method of claim 120 wherein the determination of said loading and releasing sequence based on the time required to again transfer said subset of required resources to said second resource store.

123. The method of claim 120 wherein the determination of said loading and releasing sequence based on the size of said subset of required resources to be transferred to said second resource store.

124. The method of claim 120, further including the step of determining if step (h) can convert said set of primitives to said bit-map data file in real-time while the print engine is printing, and if step (h) cannot, step (c) converting said set of primitives into said bit-map data file.

125. The method of claim 120, further including the step of determining whether step (h) or step (c) will convert said set of primitives into said bit-map data file based on the length of time required for step (h) to convert said set of primitives to said bit-map data file and the length of time required for step (c) to convert said set of primitives to said bit-map data file.

126. The method of claim 120 wherein steps (c)–(e) translates the data file into a plurality of sets of primitives corresponding to the plurality of objects within a plurality of particular portions of the document, determines a plurality of subsets of said selected resources which are required from said first resource store for printing said plurality of particular portions of the document, and defines the interdependency of said plurality of sets of primitives with said plurality of subsets of required resources.

127. The method of claim 126 wherein step (f) determines said loading and releasing sequences in which said plurality of subsets of required resources and said plurality of sets of primitives will be sent to and released from said second resource store.

128. The method of claim 120 wherein step (g) transfers said subset of required resources and said set of primitives from the host computer to the printer in an uncompressed binary data format.

129. The method of claim 120, further including the step of generating an execute signal when all of said subset of required resources and said set of primitives for said particular portion of the document are present within said second resource store and step (h), upon receiving said execute signal, creates a bit-map data file corresponding to said set of primitives and transfers said bit-map data file to the print engine for printing.

130. The method of claim 120 wherein step (e) defines said interdependency using a dependency list.

131. The method of claim 130 further including the step of maintaining said dependency list even after the print engine has started printing said particular portion of the document, step (c) using said dependency list in the event of a printer error.

132. The method of claim 120 wherein step (c) stores said set of primitives in said first resource store.

133. The method of claim 120, further including the step of choosing the size of said particular portion to be a band corresponding in size to a printer band if the printer is operating in a banding mode.

134. The method of claim 120 wherein step (g), in response to said releasing sequence, deletes said subset of required resources and said set of primitives from said second resource store.

135. A method of using a computer-printer system including a printer and a host computer for controlling and printing a document on the printer by creating a set of draw primitives for a portion of the document and transmitting the set of draw primitives and associated resources required for printing the portion of the document to the printer, the host computer having a resource storage area for storing resources, a plurality of resources stored in the resource storage area, and a data file for the document containing data describing a plurality of objects to be printed, the printer containing a print engine, the method comprising the steps of:

(a) examining the data file and selecting some of the resources from the resource storage area to form a selected set of resources required for printing the document;

(b) loading said selected set of resources in a host resource store;

(c) translating the data file into a set of primitives corresponding to the plurality of objects within a particular portion of the document;

(d) determining a subset of said selected resources which are required from said host resource store for printing said particular portion of the document;

(e) transferring said subset of required resources and said set of primitives to said printer resource store; and (f) creating a bit-map data file corresponding to said subset of required resources and said set of primitives and transferring said bit-map data file to the print engine for printing.

136. A method of using a host computer for controlling and printing a document on a printer, the host computer having a resource storage area for storing resources, a plurality of resources stored in the resource storage area, and a data file for the document containing data describing a plurality of objects to be printed, the printer having a resource scheduler to control transfer of data to the printer, a resource executor generating a bit-map data file corresponding to the data to be printed, and a print engine to control the page printing, the method comprising the steps of:

(a) examining the data file and selecting some of the resources from the resource storage area to form a selected set of resources required for printing the document;

(b) loading said selected set of resources in a first resource store;

(c) translating the data file into a set of primitives corresponding to the plurality of objects within a particular portion of the document;

(d) determining a subset of said selected resources which are required from said first resource store for printing said particular portion of the document;

(e) defining the interdependency of said set of primitives with said subset of required resources;

(f) using said defined interdependency to determine a loading and releasing sequence in which said subset of required resources and said set of primitives will be sent to a second resource store and released from said second resource store; and (g) transferring said subset of required resources and said set of primitives, according to said loading sequence, to said second resource store.

137. The method of claim 136 wherein the determination of said loading and releasing sequence is based on the amount of space available in said second resource store and when said subset of resources is required to print a future portion of the document.

138. The method of claim 136 wherein the determination of said loading and releasing sequence based on the time required to again transfer said subset of required resources to said second resource store.

139. The method of claim 136 wherein the determination of said loading and releasing sequence based on the size of said subset of required resources to be transferred to said second resource store.

140. The method of claim 136, further including the step of determining if the resource executor can convert said set of primitives to said bit-map data file in real-time while the print engine is printing, and if the resource executor cannot, step (c) converting said set of primitives into said bit-map data file.

141. The method of claim 136, further including the step of determining whether the resource executor or step (c) will convert said set of primitives into said bit-map data file based on the length of time required for the resource executor to convert said set of primitives to said bit-map data file and the length of time required for step (c) to convert said set of primitives to said bit-map data file.

142. The method of claim 136 wherein steps (c)–(e) translates the data file into a plurality of sets of primitives corresponding to the plurality of objects within a plurality of particular portions of the document, determines a plurality of subsets of said selected resources which are required from said first resource store for printing said plurality of particular portions of the document, and defines the interdependency of said plurality of sets of primitives with said plurality of subsets of required resources.

143. The method of claim 142 wherein step (f) determines said loading and releasing sequence in which said plurality of subsets of required resources and said plurality of sets of primitives will be sent to and released from said second resource store.

144. The method of claim 136 wherein step (g) transfers said subset of required resources and said set of primitives from the host computer to the printer in an uncompressed binary data format.

145. The method of claim 136 wherein step (e) defines said interdependency using a dependency list.

146. The method of claim 145, further including the step of maintaining said dependency list even after the print engine has started printing said particular portion of the document, step (c) using said dependency list in the event of a printer error.

147. The method of claim 136, further including the step of choosing the size of said particular portion to be a band corresponding in size to a printer band if the printer is operating in a banding mode.

148. A method of using a printer system, containing a print engine, for printing a document from a host computer, the host computer having a resource storage area for storing resources, a plurality of resources stored in the resource storage area, a data file for the document containing data describing a plurality of objects to be printed on the page, a host resource store storing a selected set of resources comprising a plurality of the resources required to print the document, a resource assembler examining the data file and selecting some of the resources from the resource storage area to form the selected set of resources required for printing the document, the resource assembler loading the selected set of resources in the host resource store, translating the data file into a set of primitives corresponding to the plurality of objects within a particular portion of the document, determining a subset of said selected resources which are required from the host resource store for printing the particular portion of the document, and defining the interdependency of the set of primitives with the subset of required resources, the host computer also having a resource loader using the defined interdependency to determine a loading and releasing sequence in which the subset of required resources will be sent to the printer and released from the printer, the method comprising the steps of:

(a) storing the subset of required resources and the set of primitives received from the host computer in a printer resource store;

(b) controlling transfer of said subset of required resources and said set of primitives from the host computer;

(c) using the defined interdependency to determine when the subset of required resources and the set of primitives are present within said printer resource store;

(d) generating an execute signal when all of the subset of required resources and the set of primitives are present within said printer resource store; and (e) creating a bit-map data file corresponding to the subset of required resources and the set of primitives upon receiving said execute signal, and transferring said bit-map data file to the print engine for printing.

149. A method of using a computer-printer system including a printer and a host computer for controlling and printing a document on the printer, the host computer having a resource storage area for storing resources, a plurality of resources stored in the resource storage area, and a data file for the document containing data describing a plurality of objects to be printed, the printer containing a print engine and error sensors which generate an error signal in the event of an error in printing, the method comprising the steps of:

(a) examining the data file and selecting some of the resources from the resource storage area to form a selected set of resources required for printing the document;

(b) loading said selected set of resources in a first resource store;

(c) translating the data file into a set of primitives corresponding to the plurality of objects within a particular portion of the document;

(d) determining a subset of said selected resources which are required from said first resource store for printing said particular portion of the document;

(e) defining the interdependency of said set of primitives with said subset of required resources;

(f) transmitting said defined interdependency to the printer;

(g) using said defined interdependency to determine a loading and releasing sequence in which said subset of required resources and said set of primitives will be sent to a second resource store and released from said second resource store;

(h) transferring said subset of required resources and said set of primitives to said second resource store; and (i) creating a bit-map data file corresponding to said subset of required resources and said set of primitives and transferring said bit-map data file to the print engine for printing.

150. The method of claim 149, further including the step of determining the status of said second resource store indicating which, if any, resources are already present in said second resource store, step (g) also using said status information to determine said loading and releasing sequence.

151. The method of claim 150 wherein step (c) uses said status information to determine which additional resources are required for printing the document.

152. The method of claim 149, further including the step of determining sequence information in which a plurality of particular portions of the document are to be printed by the printer, step (g) also using said sequence information to determine said loading and releasing sequence.

153. The method of claim 152 wherein step (c) uses said sequence information to determine the order in which particular portions of the document will be processed.

154. The method of claim 149 wherein the determination of said loading and releasing sequence is based on the amount of space available in said second resource store and when said subset of resources is required to print a future portion of the document.

155. The method of claim 149 wherein the determination of said loading and releasing sequence based on the time required to again transfer said subset of required resources to said second resource store.

156. The method of claim 149 wherein the determination of said loading and releasing sequence based on the size of said subset of required resources to be transferred to said second resource store.

157. The method of claim 149, further including the step of determining if step (i) can convert said set of primitives to said bit-map data file in real-time while the print engine is printing, and if step (i) cannot, step (c) converting said set of primitives into said bit-map data file.

158. The method of claim 149, further including the step of determining whether step (i) or step (c) will convert said set of primitives into said bit-map data file based on the length of time required for step (i) to convert said set of primitives to said bit-map data file and the length of time required for step (c) to convert said set of primitives to said bit-map data file.

159. The method of claim 149 wherein steps (c)–(e) translates the data file into a plurality of sets of primitives corresponding to the plurality of objects within a plurality of particular portions of the document, determines a plurality of subsets of said selected resources which are required from said first resource store for printing said plurality of particular portions of the document, and defines the interdependency of said plurality of sets of primitives with said plurality of subsets of required resources.

160. The method of claim 159 wherein step (g) determines said loading and releasing sequences in which said plurality of subsets of required resources and said plurality of sets of primitives will be sent to and released from said second resource store.

161. The method of claim 149 wherein step (h) transfers said subset of required resources and said set of primitives from the host computer to the printer in an uncompressed binary data format.

162. The method of claim 149, further including the step of generating an execute signal when all of said subset of required resources and said set of primitives for said particular portion of the document are present within said second resource store and step (i), upon receiving said execute signal, creates a bit-map data file corresponding to said set of primitives and transfers said bit-map data file to the print engine for printing.

163. The method of claim 149 wherein step (e) defines said interdependency using a dependency list.

164. The method of claim 163, further including the step of maintaining said dependency list even after the print engine has started printing said particular portion of the document, step (c) using said dependency list in the event of a printer error.

165. The method of claim 149, further including the step of error recovery within the host computer if the printer generates an error signal.

166. The method of claim 165, further including the steps of requesting said subset of required resources and said set of primitives from said first resource store for said particular portion of the document in which said error signal was generated.

167. The method of claim 149 wherein step (c) stores said set of primitives in said first resource store.

168. The method of claim 149, further including the step of choosing the size of said particular portion to be a band corresponding in size to a printer band if the printer is operating in a banding mode.

169. The method of claim 149 wherein step (h), in response to said releasing sequence, deletes said subset of required resources and said set of primitives from said second resource store.

170. The method of claim 149, further including the step of determining whether step (g) will be performed by a resource loader alternately located within the host computer or the printer.

171. The method of claim 170 wherein said step of determining location includes analyzing communications channel capability between the host computer and the printer.

172. A method of using a host computer for controlling and printing a document on a printer, the host computer having a resource storage area for storing resources, a plurality of resources stored in the resource storage area, and a data file for the document containing data describing a plurality of objects to be printed, the printer having a resource loader to determine a loading and releasing sequence in which resources will be loaded into the printer and released from the printer, a resource scheduler to determine a resource executor generating a bit-map data file corresponding to the data to be printed, and a print engine and error sensors which generate an error signal in the event of an error in printing, the method comprising the steps of:

(a) examining the data file and selecting some of the resources from the resource storage area to form a selected set of resources required for printing the document;

(b) loading said selected set of resources in a first resource store;

(c) translating the data file into a set of primitives corresponding to the plurality of objects within a particular portion of the document;

(d) determining a subset of said selected resources which are required from said first resource store for printing said particular portion of the document;

(e) defining the interdependency of said set of primitives with said subset of required resources;

(f) transmitting said defined interdependency to the printer;

(g) transferring said subset of required resources and said set of primitives to said second resource store.

173. The method of claim 172 wherein the resource scheduler determines a sequence information in which a plurality of particular portions of the document are to be printed by the printer and transmits said sequence information to said resource assembler, said resource assembler using said sequence information to determine the order in which particular portions of the document will be processed by said resource assembler.

174. The method of claim 172, further including the step of determining if the resource executor can convert said set of primitives to said bit-map data file in real-time while the print engine is printing, and if the resource executor cannot, step (c) converting said set of primitives into said bit-map data file.

175. The method of claim 172, further including the step of determining whether the resource executor or step (c) will convert said set of primitives to said bit-map data file based on the length of time required for the resource executor to convert said set of primitives to said bit-map data file and the length of time required for step (c) to convert said set of primitives to said bit-map data file.

176. The method of claim 172 wherein steps (c)–(e) translates the data file into a plurality of sets of primitives corresponding to the plurality of objects within a plurality of particular portions of the document, determines a plurality of subsets of said selected resources which are required from said first resource store for printing said plurality of particular portions of the document, and defines the interdependency of said plurality of sets of primitives with said plurality of subsets of required resources.

177. The method of claim 172 wherein step (e) defines said interdependency using a dependency list.

178. The method of claim 177, further including the step of maintaining said dependency list even after the print engine has started printing said particular portion of the document, step (c) using said dependency list in the event of a printer error.

179. The method of claim 172, further including the step of error recovery within the host computer if the printer generates an error signal.

180. The method of claim 179, further including the steps of requesting said subset of required resources and said set of primitives from said first resource store for said particular portion of the document in which said error signal was generated.

181. A method of using a printer system, containing a print engine, for printing a document from a host computer, the host computer having a resource storage area for storing resources, a plurality of resources stored in the resource storage area, a data file for the document containing data describing a plurality of objects to be printed on the page, a host resource store storing a selected set of resources comprising a plurality of the resources required to print the document, a resource assembler examining the data file and selecting some of the resources from the resource storage area to form the selected set of resources required for printing the document, the resource assembler loading the selected set of resources in the host resource store, translating the data file into a set of primitives corresponding to the plurality of objects within a particular portion of the document, determining a subset of said selected resources which are required from the host resource store for printing the particular portion of the document, defining the interdependency of the set of primitives with the subset of required resources, and transmitting the defined interdependency to the printer, the method comprising the steps of:

(a) storing the subset of required resources and the set of primitives received from the host computer in a secondary resource store;

(b) using the defined interdependency to determine a loading and releasing sequence in which the subset of required resources and the set of primitives will be sent to said secondary resource store and released from said secondary resource store;

(c) controlling transfer of said subset of required resources and said set of primitives from the host computer according to said loading sequence;

(d) determining when the subset of required resources and the set of primitives are present within said secondary resource store;

(e) generating an execute signal when all of the subset of required resources and the set of primitives are present within said secondary resource store; and (f) creating a bit-map data file corresponding to the subset of required resources and the set of primitives upon receiving said execute signal, and transferring said bit-map data file to the print engine for printing.

182. The method of claim 181, further including the step of determining the status of said secondary resource store indicating which, if any, resources are already present in said secondary resource store, step (b) also using said status information to determine said loading and releasing sequence.

183. The method of claim 181, further including the step of determining sequence information in which a plurality of particular portions of the document are to be printed by the printer, step (b) also using said sequence information to determine said loading and releasing sequence.

184. The method of claim 183, further including the step of transmitting said sequence information to the host computer, the host computer using said sequence information to determine the order in which particular portions of the document will be processed.

* * * * *

UNITED STATES PATENT AND TRADEMARK OFFICE
CERTIFICATE OF CORRECTION

PATENT NO. : 5,469,533
DATED : November 21, 1995
INVENTOR(S) : Stephen V. Dennis

It is certified that error appears in the above-indentified patent and that said Letters Patent is hereby corrected as shown below:

On title page, item [22], delete "Jul. 19, 1992" and insert therefor --Jul. 10, 1992--.

In column 26, claim 19, line 46, please delete "mount" and insert therefor --amount--.

In column 31, claim 61, line 16, please delete "Of" and insert therefor --of--.

In column 42, claim 164, line 7, please delete "the-step" and insert therefor --the step--.

Signed and Sealed this

Nineteenth Day of March, 1996

Attest:

BRUCE LEHMAN

*Attesting Officer*    *Commissioner of Patents and Trademarks*